US012716978B2

(12) United States Patent
Phuyal et al.

(10) Patent No.: US 12,716,978 B2
(45) Date of Patent: Aug. 25, 2026

(54) REDUCING MEASUREMENT AND REPORTING OVERHEAD FOR AERIAL VEHICLES

(71) Applicant: QUALCOMM Incorporated, San Diego, CA (US)

(72) Inventors: Umesh Phuyal, San Diego, CA (US); Le Liu, San Jose, CA (US); Chiranjib Saha, San Diego, CA (US); Wanshi Chen, San Diego, CA (US); Masato Kitazoe, Tokyo (JP); Bharat Shrestha, San Diego, CA (US); Xiao Feng Wang, San Diego, CA (US); Alberto Rico Alvarino, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/865,506

(22) Filed: Jul. 15, 2022

(65) Prior Publication Data

US 2024/0019518 A1 Jan. 18, 2024

(51) Int. Cl.

| | |
|---|---|
| ***G01S 1/18*** | (2006.01) |
| ***B64C 39/02*** | (2023.01) |
| ***G08G 5/00*** | (2025.01) |
| ***H04B 7/185*** | (2006.01) |
| ***H04B 17/00*** | (2015.01) |
| ***H04W 24/10*** | (2009.01) |

(52) U.S. Cl.
CPC ............... *G01S 1/18* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2017/0324469 | A1 * | 11/2017 | Jalali | H04W 24/08 |
| 2017/0325221 | A1 * | 11/2017 | Jalali | H04W 72/0446 |
| 2024/0038076 | A1 * | 2/2024 | Omi | G08G 5/34 |
| 2024/0146384 | A1 * | 5/2024 | Bhamri | H04B 7/0695 |

FOREIGN PATENT DOCUMENTS

| | | | |
|---|---|---|---|
| CN | 116941192 A * | 10/2023 | H04B 7/0695 |
| WO | WO-2017193083 A1 * | 11/2017 | H01Q 1/28 |

* cited by examiner

*Primary Examiner* — Pablo N Tran
(74) *Attorney, Agent, or Firm* — Holland & Hart LLP

(57) ABSTRACT

Methods, systems, and devices for wireless communication are described. An aerial UE may receive control signaling that indicates a plurality of beam measurement configurations that the aerial UE is to use for beam measurement and reporting associated with a plurality of beams. The aerial UE may monitor a set of beams of the plurality of beams in accordance with a subset of beam measurement configurations of the plurality of beam measurement configurations based on a current time, a current location of the aerial UE, or both, for example. The aerial UE may transmit a measurement report indicating one or more measurements of a subset of beams of the set of beams in accordance with the subset of beam measurement configurations. In some examples, the subset of beam measurement configurations may be associated with an altitude threshold, a three-dimensional zone, or a combination thereof.

23 Claims, 14 Drawing Sheets

Transmit control signaling that indicates a plurality of beam measurement configurations that an aerial UE is to use for beam measurement and reporting associated with a plurality of beams, each of the plurality of beam measurement configurations corresponding to at least one of a time period or a location of the aerial UE

1405

Receive a measurement report including indications of one or more measurements of a subset of beams of the plurality of beams in accordance with a subset of beam measurement configurations of the plurality of beam measurement configurations, wherein the subset of beams and the subset of beam measurement configurations are based at least in part on a location of the aerial UE or a current time associated with the aerial UE

1410

1400

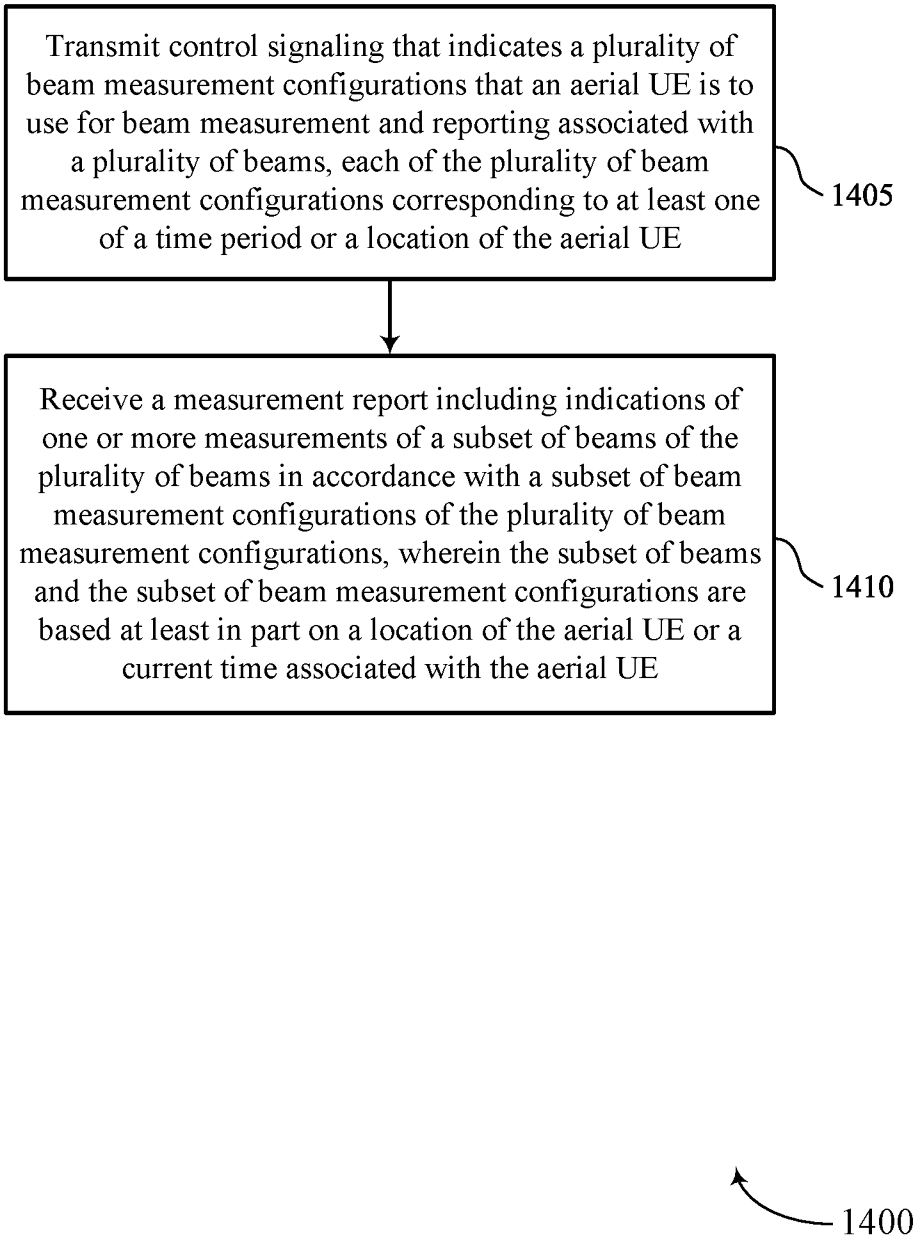

FIG. 14

REDUCING MEASUREMENT AND REPORTING OVERHEAD FOR AERIAL VEHICLES

FIELD OF TECHNOLOGY

The following relates to wireless communication, including reducing measurement and reporting overhead for aerial vehicles.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may perform beam measurements according to a beam measurement configuration. The UE may send a measurement report to a network entity based on the performed beam measurements. In some cases, a UE may be an aerial UE, such as an unmanned (e.g., uncrewed) aerial vehicle (UAV), a drone, an aerial vehicle, or another aerial device. Conventional measurement reporting techniques for aerial UEs are deficient.

SUMMARY

The described techniques relate to improved methods, systems, devices, and apparatuses that support reducing measurement and reporting overhead for aerial vehicles. For example, the described techniques provide for an aerial UE to receive control signaling that indicates a plurality of beam measurement configurations that the aerial UE is to use for beam measurement and reporting associated with a plurality of beams. The aerial UE may monitor a set of beams of the plurality of beams in accordance with a subset of beam measurement configurations of the plurality of beam measurement configurations based on a current time, a current location of the aerial UE, or both, for example. The aerial UE may transmit a measurement report indicating one or more measurements of a subset of beams of the set of beams in accordance with the subset of beam measurement configurations.

A method for wireless communication at an aerial user equipment (UE) is described. The method may include receiving control signaling that indicates a set of multiple beam measurement configurations that the aerial UE is to use for beam measurement and reporting associated with a set of multiple beams, monitoring a set of beams of the set of multiple beams in accordance with a subset of beam measurement configurations of the set of multiple beam measurement configurations, the subset of beam measurement configurations being based on a current time, or a current location of the aerial UE, or both, and transmitting a measurement report indicating one or more measurements of a subset of beams of the set of beams in accordance with the subset of beam measurement configurations.

An apparatus for wireless communication at an aerial UE is described. The apparatus may include a processor, memory coupled with the processor, and instructions stored in the memory. The instructions may be executable by the processor to cause the apparatus to receive control signaling that indicates a set of multiple beam measurement configurations that the aerial UE is to use for beam measurement and reporting associated with a set of multiple beams, monitor a set of beams of the set of multiple beams in accordance with a subset of beam measurement configurations of the set of multiple beam measurement configurations, the subset of beam measurement configurations being based on a current time, or a current location of the aerial UE, or both, and transmit a measurement report indicating one or more measurements of a subset of beams of the set of beams in accordance with the subset of beam measurement configurations.

Another apparatus for wireless communication at an aerial UE is described. The apparatus may include means for receiving control signaling that indicates a set of multiple beam measurement configurations that the aerial UE is to use for beam measurement and reporting associated with a set of multiple beams, means for monitoring a set of beams of the set of multiple beams in accordance with a subset of beam measurement configurations of the set of multiple beam measurement configurations, the subset of beam measurement configurations being based on a current time, or a current location of the aerial UE, or both, and means for transmitting a measurement report indicating one or more measurements of a subset of beams of the set of beams in accordance with the subset of beam measurement configurations.

A non-transitory computer-readable medium storing code for wireless communication at an aerial UE is described. The code may include instructions executable by a processor to receive control signaling that indicates a set of multiple beam measurement configurations that the aerial UE is to use for beam measurement and reporting associated with a set of multiple beams, monitor a set of beams of the set of multiple beams in accordance with a subset of beam measurement configurations of the set of multiple beam measurement configurations, the subset of beam measurement configurations being based on a current time, or a current location of the aerial UE, or both, and transmit a measurement report indicating one or more measurements of a subset of beams of the set of beams in accordance with the subset of beam measurement configurations.

Some examples of the method, apparatuses, and non-transitory computer-readable medium described herein may further include operations, features, means, or instructions for transmitting an indication of a flight path associated with the aerial UE, where the control signaling that indicates the set of multiple beam measurement configurations may be received based on the flight path.

In some examples of the method, apparatuses, and non-transitory computer-readable medium described herein, monitoring the set of beams may include operations, features, means, or instructions for monitoring the set of beams in accordance with the subset of beam measurement configurations that may be based on the current time relative to a flight path associated with the aerial UE.

Some examples of the method, apparatuses, and non-transitory computer-readable medium described herein may further include operations, features, means, or instructions for receiving control signaling that activates the subset of beam measurement configurations, where monitoring the set of beams may be based at least part on the activated subset of beam measurement configurations.

In some examples of the method, apparatuses, and non-transitory computer-readable medium described herein, transmitting the measurement report may include operations, features, means, or instructions for transmitting the measurement report that indicates the one or more measurements associated with one or more beams selected based on the current time or the current time relative to a flight path associated with the aerial UE.

In some examples of the method, apparatuses, and non-transitory computer-readable medium described herein, transmitting the measurement report may include operations, features, means, or instructions for transmitting the measurement report that indicates the one or more measurements associated with one or more beams selected based on an antenna configuration of the aerial UE.

Some examples of the method, apparatuses, and non-transitory computer-readable medium described herein may further include operations, features, means, or instructions for monitoring the set of beams in accordance with the subset of beam measurement configurations that may be based on the current location, where the current location may be an altitude of the aerial UE.

Some examples of the method, apparatuses, and non-transitory computer-readable medium described herein may further include operations, features, means, or instructions for determining the beam measurement configurations based on the altitude of the aerial UE relative to an altitude threshold.

In some examples of the method, apparatuses, and non-transitory computer-readable medium described herein, receiving the control signaling may include operations, features, means, or instructions for receiving the control signaling that indicates the set of multiple beam measurement configurations that may be associated with respective altitude thresholds that may be to be used by the aerial UE to determine the subset of beam measurement configurations for beam measurement and reporting.

Some examples of the method, apparatuses, and non-transitory computer-readable medium described herein may further include operations, features, means, or instructions for transmitting the measurement report that indicates the one or more measurements associated with one or more beams selected based on an altitude of the aerial UE relative to an altitude threshold.

In some examples of the method, apparatuses, and non-transitory computer-readable medium described herein, the one or more beams may be associated with the subset of beam measurement configurations associated with an altitude range in which the aerial UE may be operating.

In some examples of the method, apparatuses, and non-transitory computer-readable medium described herein, the one or more beams may be selected as being associated with a set of measurement metrics that may be higher or lower than other measurement metrics of a set of multiple beam measurements associated with the subset of beam measurement configurations.

Some examples of the method, apparatuses, and non-transitory computer-readable medium described herein may further include operations, features, means, or instructions for monitoring the set of beams in accordance with the beam measurement configurations that may be based on the current location, where the current location may be a zone identifier of a zone in which the aerial UE may be operating.

In some examples of the method, apparatuses, and non-transitory computer-readable medium described herein, receiving the control signaling may include operations, features, means, or instructions for receiving the control signaling that indicates the set of multiple beam measurement configurations that may be associated with respective zone identifiers that may be to be used by the aerial UE to determine the subset of beam measurement configurations for beam measurement and reporting.

Some examples of the method, apparatuses, and non-transitory computer-readable medium described herein may further include operations, features, means, or instructions for receiving control signaling that activates the subset of beam measurement configurations based on a current zone in which the UE may be operating.

Some examples of the method, apparatuses, and non-transitory computer-readable medium described herein may further include operations, features, means, or instructions for transmitting the measurement report that indicates the one or more measurements associated with one or more beams selected based on a zone in which the aerial UE may be operating.

In some examples of the method, apparatuses, and non-transitory computer-readable medium described herein, the one or more beams may be associated with the subset of beam measurement configurations for the zone.

In some examples of the method, apparatuses, and non-transitory computer-readable medium described herein, the one or more beams may be associated with a set of measurement metrics that may be higher or lower than other measurement metrics of a set of multiple beam measurements associated with the subset of beam measurement configurations for the zone.

In some examples of the method, apparatuses, and non-transitory computer-readable medium described herein, receiving the control signaling may include operations, features, means, or instructions for receiving a measurement object that indicates one or more of the set of multiple beam measurement configurations and includes one or more fields associated with determining the subset of beam measurement configurations by the aerial UE.

In some examples of the method, apparatuses, and non-transitory computer-readable medium described herein, the measurement object includes an altitude fields, a time field, a zone field, or a combination thereof.

Some examples of the method, apparatuses, and non-transitory computer-readable medium described herein may further include operations, features, means, or instructions for transmitting an indication of a capability of the aerial UE of supporting beam measurement configurations that may be based on a current time, or a current location of the aerial UE, or both, where the control signaling may be received based on transmitting the indication.

A method for wireless communication at a network entity is described. The method may include transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE and receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

An apparatus for wireless communication at a network entity is described. The apparatus may include a processor, memory coupled with the processor, and instructions stored in the memory. The instructions may be executable by the processor to cause the apparatus to transmit control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE and receive a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

Another apparatus for wireless communication at a network entity is described. The apparatus may include means for transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE and means for receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

A non-transitory computer-readable medium storing code for wireless communication at a network entity is described. The code may include instructions executable by a processor to transmit control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE and receive a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

Some examples of the method, apparatuses, and non-transitory computer-readable medium described herein may further include operations, features, means, or instructions for receiving an indication of a flight path associated with the aerial UE, where the set of multiple beam measurement configurations may be based on the flight path.

Some examples of the method, apparatuses, and non-transitory computer-readable medium described herein may further include operations, features, means, or instructions for transmitting control signaling that activates the subset of beam measurement configurations.

Some examples of the method, apparatuses, and non-transitory computer-readable medium described herein may further include operations, features, means, or instructions for receiving the measurement report that indicates the one or more measurements associated with one or more beams selected based on the current time or the current time relative to a flight path associated with the aerial UE.

Some examples of the method, apparatuses, and non-transitory computer-readable medium described herein may further include operations, features, means, or instructions for receiving the measurement report that indicates the one or more measurements associated with one or more beams selected based on an antenna configuration of the aerial UE.

In some examples of the method, apparatuses, and non-transitory computer-readable medium described herein, transmitting the control signaling may include operations, features, means, or instructions for transmitting the control signaling that indicates the set of multiple beam measurement configurations that may be associated with respective altitude thresholds that may be to be used by the aerial UE to determine the subset of beam measurement configurations for beam measurement and reporting.

In some examples of the method, apparatuses, and non-transitory computer-readable medium described herein, receiving the measurement report may include operations, features, means, or instructions for receiving the measurement report that indicates the one or more measurements associated with one or more beams that may be based least in part on an altitude of the aerial UE relative to an altitude threshold.

In some examples of the method, apparatuses, and non-transitory computer-readable medium described herein, the one or more beams may be associated with the subset of beam measurement configurations for an altitude range.

In some examples of the method, apparatuses, and non-transitory computer-readable medium described herein, the one or more beams may be associated with a set of higher measurements of a set of multiple beam measurements associated with the subset of beam measurement configurations.

In some examples of the method, apparatuses, and non-transitory computer-readable medium described herein, transmitting the control signaling may include operations, features, means, or instructions for transmitting the control signaling that indicates the set of multiple beam measurement configurations that may be associated with respective zone identifiers that may be to be used by the aerial UE to determine the subset of beam measurement configurations for beam measurement and reporting.

Some examples of the method, apparatuses, and non-transitory computer-readable medium described herein may further include operations, features, means, or instructions for transmitting control signaling that activates the subset of beam measurement conjurations based on a current zone in which the UE may be operating.

Some examples of the method, apparatuses, and non-transitory computer-readable medium described herein may further include operations, features, means, or instructions for receiving the measurement report that indicates the one or more measurements associated with one or more beams selected based on a zone in which the aerial UE may be operating.

In some examples of the method, apparatuses, and non-transitory computer-readable medium described herein, the one or more beams may be associated with the subset of beam measurement configurations for the zone.

In some examples of the method, apparatuses, and non-transitory computer-readable medium described herein, the one or more beams may be associated with a set of higher measurements of a set of multiple beam measurements associated with the subset of beam measurement configurations for the zone.

In some examples of the method, apparatuses, and non-transitory computer-readable medium described herein, transmitting the control signaling may include operations, features, means, or instructions for transmitting a measurement object that indicates one or more of the set of multiple beam measurement configurations and includes one or more fields associated with determining the subset of beam measurement configurations by the aerial UE.

In some examples of the method, apparatuses, and non-transitory computer-readable medium described herein, the measurement object includes an altitude fields, a time field, a zone field, or a combination thereof.

Some examples of the method, apparatuses, and non-transitory computer-readable medium described herein may further include operations, features, means, or instructions for receiving an indication of a capability of the aerial UE of supporting beam measurement configurations that may be based on a current time, or a current location of the aerial UE, or both, where the control signaling may be transmitted based on receiving the indication.

BRIEF DESCRIPTION OF THE DRAWINGS

FIGS. 13 and 14 show flowcharts illustrating methods that support reducing measurement and reporting overhead for aerial vehicles in accordance with one or more aspects of the present disclosure.

DETAILED DESCRIPTION

A UE may perform beam measurements on beams associated with a connected cell and neighboring cells. For example, the UE may perform beam measurements on available beams and determine beams for performing beam measurement reporting. Aerial UEs (e.g., UAVs, drones, aerial vehicles, or another aerial device) may have a higher visibility of available cells (e.g., may detect more cells than a terrestrial UE) due to having a direct line of sight to more cells. As such, aerial UEs may perform an increased amount of beam measurements and may perform an increased amount of beam measurement reporting relative to terrestrial UEs, resulting in increased power consumption, or network congestion, or both. The techniques described herein may reduce the quantity of measurements performed by aerial UEs and reduce the reporting overhead to conserve power and signaling resources.

In accordance with examples as described herein, beam measurements and beam reporting for an aerial UE may be reduced based on a current time and the positioning or flight path of the aerial UE. In some examples, an aerial UE may estimate and report a flight path to a network entity. The network entity may configure a set of beam measurement configurations based on the flight path, and the beam measurement configurations may contain indications of one or more beams to be measured and/or reported based on a current time, a location of the aerial UE, or a combination thereof. For example, the configurations may be activated based on a time (e.g., absolute time or a timer) corresponding to a location of the aerial UE obtained from the flight path. Alternatively, or additionally, the configurations may be activated and deactivated by the network entity using control signaling as the aerial UE moves. The aerial UE may determine (e.g., based on historical observations of flight paths) to exclude some beams from measurements/reports autonomously, and may prioritize some beams based on the flight path.

In some examples, the aerial UE may be configured with beam measurement configurations that are selected and used based on a location of the aerial UE, and the location may be a height (e.g., altitude) or a zone (e.g., a three-dimensional zone). The aerial UE may compare the height to one or more thresholds to identify a configuration to use or may use a beam configuration that is mapped to a current zone. The UE may also report a subset of measured beams based on height (relative to a threshold) or the current zone.

Aspects of the disclosure are initially described in the context of wireless communications systems. Aspects of the disclosure are additionally described and illustrated in the context of a process flow. Aspects of the disclosure are further illustrated by and described with reference to apparatus diagrams and flowcharts that relate to reducing measurement and reporting overhead for aerial vehicles.

Figure 1:
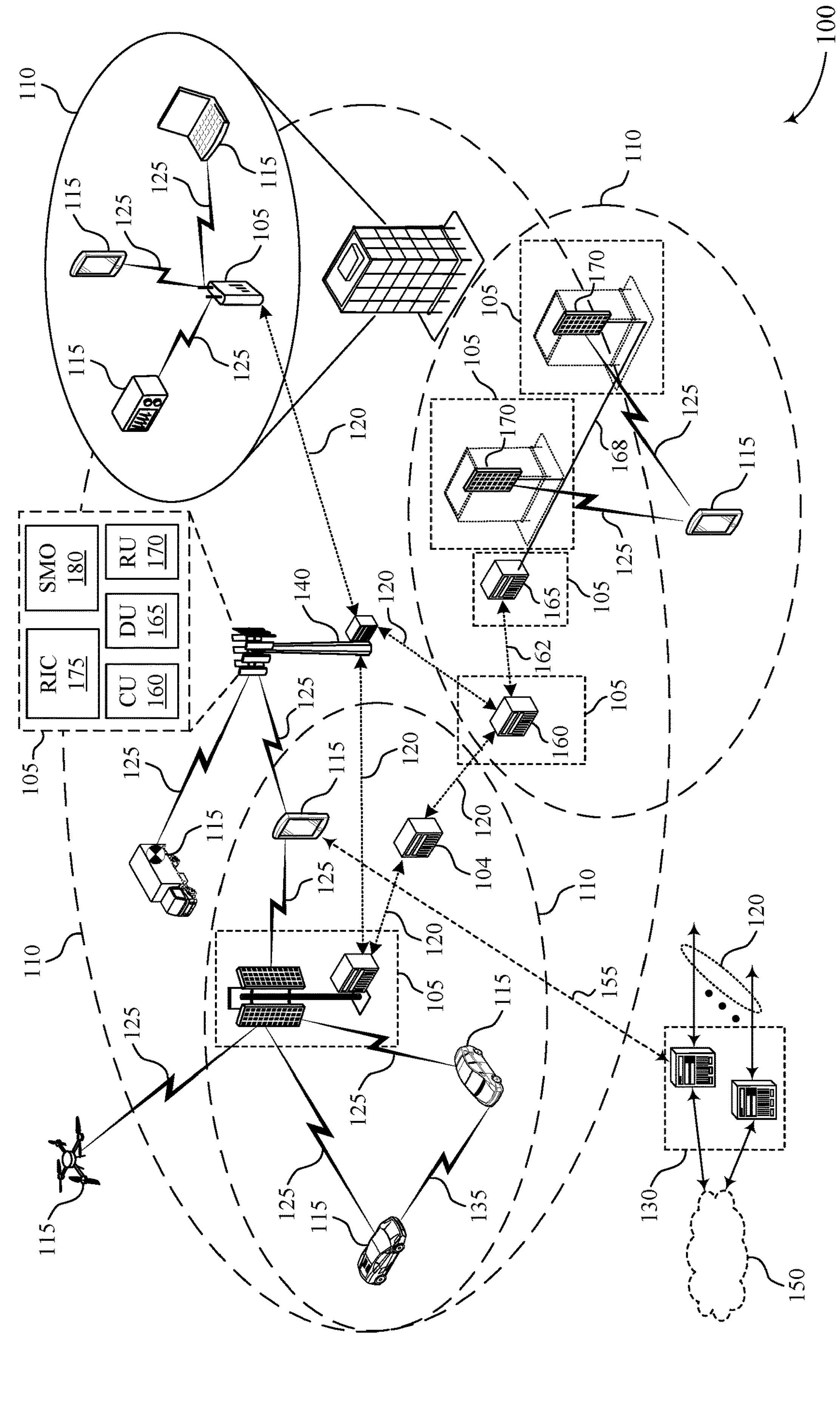
FIG. 1 illustrates an example of a wireless communications system that supports reducing measurement and reporting overhead for aerial vehicles in accordance with one or more aspects of the present disclosure.

FIG. 1 illustrates an example of a wireless communications system 100 that supports reducing measurement and reporting overhead for aerial vehicles in accordance with one or more aspects of the present disclosure. The wireless communications system 100 may include one or more network entities 105, one or more UEs 115, and a core network 130. In some examples, the wireless communications system 100 may be a Long Term Evolution (LTE)

network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reducing measurement and reporting overhead for aerial vehicles as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term “carrier” may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms “transmitting,” “receiving,” or “communicating,” when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a network entity 105, or a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples. A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a UE 115 may be configured to transmit measurement reports associated with a beam to a network entity 105 (e.g., a cell). In some examples, the UE 115 may be configured to transmit measurement reports when one or more individual parameters (e.g., a reference signal received power (RSRP), reference signal received quality (RSRQ), or another parameter) associated with each of a configured quantity of network entities 105 (e.g., N, where $2 \leq N \leq 8$) fulfils a configured event (e.g., exceeds or falls below a threshold). The UE 115 may refrain from transmitting new measurement reports until a list of network entities 105 (e.g., a list of triggered cells) falls below the configured quantity of network entity 105. In some examples, the UE 115 may be configured to additionally transmit measurements for a related beam (e.g., neighboring beams) when transmitting a measurement report for a beam.

In some examples, UE 115 may be an example of an aerial UE 115 (e.g., a UAV, drone, or another aerial device). An aerial UE 115 may have higher visibility and exposure to larger quantity of network entities 105 (e.g., cells) and their respective beams than a terrestrial UE 115. This may be due to the aerial UE 115 having a direct line of sight to a larger amount of network entities 105 and being in a free-space-like environment, for example. As such, the aerial UE 115 may perform an increased amount of beam measurements and beam measurement reporting relative to terrestrial UEs 115, which may result in increased power consumption and network congestion.

In accordance with examples as disclosed herein, an aerial UE 115 may be configured to perform a reduced amount of beam measurements and beam reports based on positioning of the aerial UE 115, for example. In some cases, the aerial UE 115 may determine or estimate a flight path and transmit a report of the flight path to a network entity 105. The network entity 105 may configure the aerial UE 115 with one or more beam measurement configurations based on the flight path of the UE 115. For example, the beam measurement configurations may contain one or more beams to be measured and/or reported. In some examples, the configurations may be activated based on a time (e.g., an absolute time or after a timer expiration) determined based on the flight path of the UE 115. Additionally, or alternatively, the network entity 105 may activate and deactivate configurations (e.g., using RRC signaling or a MAC control element (MAC-CE)) as the aerial UE 115 moves along the flight path. In some examples, the aerial UE 115 may determine to exclude beams from measurements or reports autonomously (e.g., based on historical observations during previous flight paths), and may prioritize other beams for measurements or reports based on the current flight path. Accordingly, the aerial UE 115 may prioritize beam measurements and beam reporting for beams along the flight path, thereby reducing power consumption and network congestion caused by measurements and reports of other beams.

In some examples, the aerial UE 115 may be configured with height (e.g., altitude) thresholds. One or more beams may be associated with height ranges defined by the height thresholds, so that the aerial UE 115 may select beams to measure or report based on a current height of the aerial UE 115 (e.g., determined using an altitude meter or indicated by a network entity 105). Additionally, or alternatively, the aerial UE 115 may be configured with zones (e.g., three-dimensional zones) associated with the one or more beams, for example, by configuring thresholds for latitude, longitude, and altitude ranges. As such, the aerial UE 115 may select beams to measure or report based on a current zone in which the aerial UE 115 is located in (e.g., determined using a global positioning system (GPS) or indicated by a network entity 105).

Thus, according to the techniques described herein, an aerial UE 115 may measure beams based on a time associated with the UE 115 or a location (e.g., height or zone) of the UE 115. In some examples, the selection of beams to measure may be performed autonomously by the UE 115 or based on the beam measurement configurations signaled to the UE 115. Additionally, the UE 115 may report a subset of the measured beams. The subset of measured beams to report may be determined autonomously by the UE based on the time associated with the UE 115 and/or the location (e.g., height or zone) of the UE 115. The subset of measurement beams to report may also be based on the beam measurement configurations signaled to the UE 115. As such, rather than measuring all beams that the UE 115 is able to detect, the UE 115 may measure a subset of beams. Further, rather than reporting all beams that the UE 115 measures, the UE 115 may report a subset of measurements. As such, measurement and reporting overhead may be reduced in aerial UEs 115 using the techniques described herein.

Figure 2:
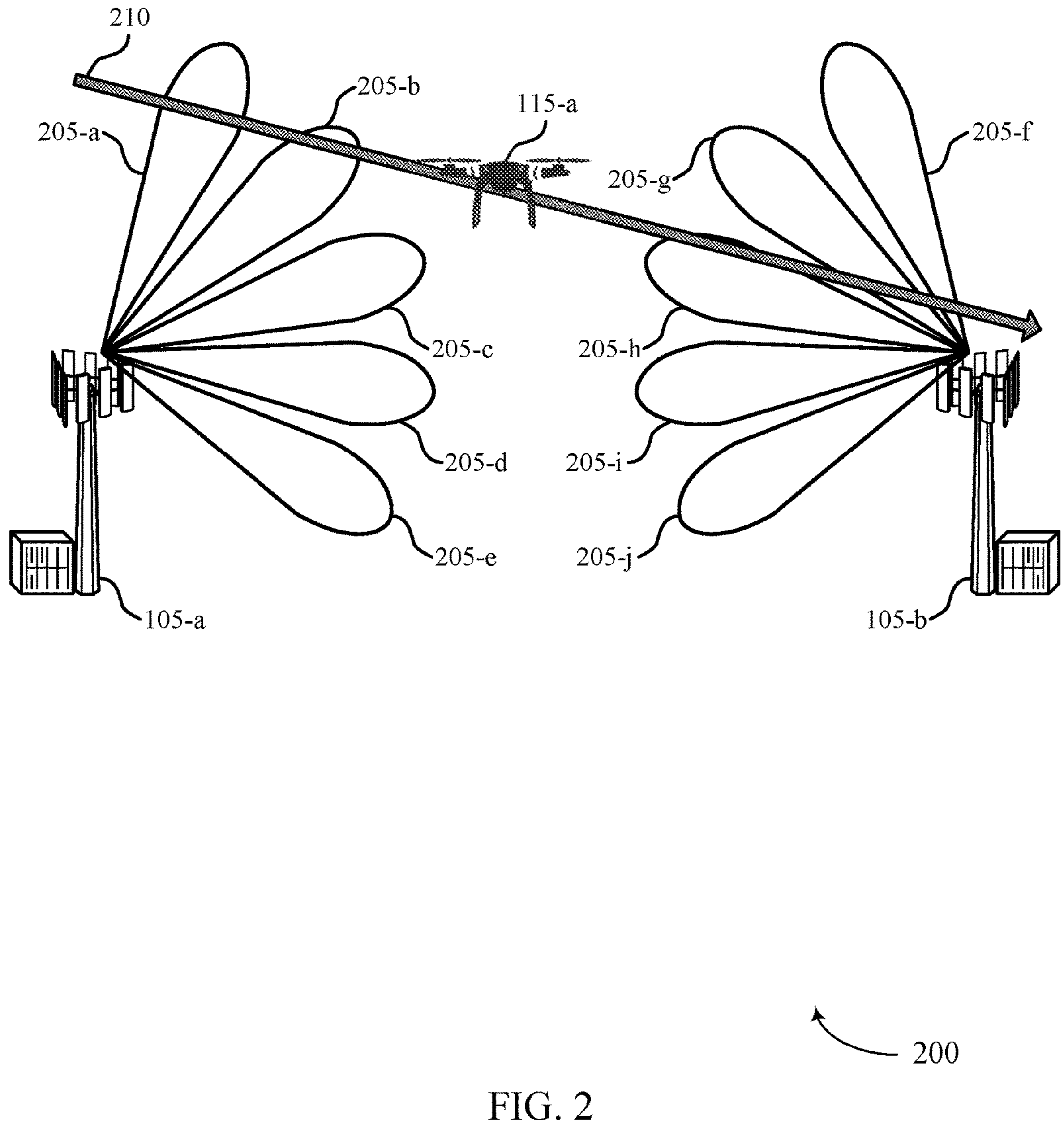
FIG. 2 illustrates an example of a wireless communications system that supports reducing measurement and reporting overhead for aerial vehicles in accordance with one or more aspects of the present disclosure.

FIG. 2 illustrates an example of a wireless communications system 200 that supports reducing measurement and reporting overhead for aerial vehicles in accordance with one or more aspects of the present disclosure. The wireless communications system 200 may be an example of wireless communications system 100 as described herein with reference to FIG. 1. For example, wireless communications system 200 may illustrate communications between a UE 115-*a* and network entities 105-*a* and 105-*b*, which may be examples of corresponding devices as described with reference to FIG. 1. Similarly, FIG. 2 illustrates beams 205, such as beams 205-*a*, 205-*b*, 205-*c*, 205-*d*, and 205-*e* associated with network entity 105-*a* and beams 205-*f*, 205-*g*, 205-*h*, 205-*i*, and 205-*j* associated with network entity 105-*b*, which may support communication links 125 as described with reference to FIG. 1.

The UE 115-*a*, which may be an example of an aerial UE 115 (e.g., a UAV, drone, or another aerial device), may be associated with a flight path 210. For example, the UE 115-*a* may estimate or be configured with flight path 210, which may include one or more projected time and locations of the UE 115-*a*. The UE 115-*a* may report (e.g., transmit an indication of) flight path 210 to a network entity 105 (e.g., network entity 105-*a*, network entity 105-*b*, or another network entity 105). As such, the network entity 105 may be aware of the one or more projected time and locations of the UE 115-*a*. Additionally, the network entity 105 may be aware of information relating to network entities 105-*a* and 105-*b* (e.g., which may be or support radio cells), beams 205, and locations in which beams 205 may be measured. In some examples, network entity 105 may be aware of beam and location information due to previous deployment information (e.g., of a UE 115) or due to previous (e.g., historical) reporting of beam measurements by UE 115-*a* or other UEs 115 (e.g., aerial UEs 115).

The network entity 105 may configure the UE 115-*a* with one or more beam measurement configurations based on the flight path 210 of the UE 115-*a*. The beam measurement configurations may each correspond to a respective location (e.g., along the flight path 210). The network entity 105 may determine a time at which the UE 115-*a* may be at each location based on the flight path 210. As such, the network entity 105 may configure the UE 115-*a* to activate one or more beam measurement configurations based on an absolute time or after the expiration of a timer, corresponding to a time at which the UE 115-*a* may be at a location associated with a beam measurement configuration to be activated. For example, each beam measurement configuration may be associated with a time (e.g., or timer) at which the configuration is to become active at the UE 115-*a*, and, in some cases, the UE 115-*a* may deactivate previous configurations after activating a current configuration. Additionally, or alternatively, the network entity 105 may indicate the UE 115-*a* to activate or deactivate measurement configurations and reporting configurations (e.g., using RRC signaling or MAC-CE signaling), for example, based on a current location of the UE 115-*a* (e.g., determined by the network entity 105, or reported by the UE 115-*a*). Accordingly, the UE 115-*a* may measure and/or report beams 205 according to the active beam measurement configurations, which may be based on the flight path 210 of the UE 115-*a*.

The UE 115-*a* may prioritize reporting beams 205 based on the beam measurement configurations, and, in some cases, historical (e.g., previous) observations. For example, if the UE 115-*a* is moving in the direction of flight path 210 as shown in FIG. 2, the UE 115-*a* may measure beams 205-*a*, 205-*b*, and 205-*c* corresponding to network entity 105-*a* and beams 205-*f*, 205-*g*, and 205-*h* corresponding to network entity 105-*b*. The UE 115-*a* may determine (e.g., based on historical observations) to prioritize reporting measurements of beams 205-*f*, 205-*g*, and 205-*h*. For example, the UE 115-*a* may decide to exclude beams 205-*a*, 205-*b*, and 205-*c* from a measurement report, even if the UE 115-*a* may have already performed measurements of the aforementioned beams 205. Similarly, in some cases, the UE 115-*a* may determine that by a time the UE 115-*a* is ready to perform a measurement report, some measurements may be stale or obsolete. For example, the UE 115-*a* may determine that it has moved past beams 205-*a*, 205-*b*, and 205-*c*, and decide not to include measurements of beams 205-*a*, 205-*b*, and 205-*c* in a measurement report.

In some examples, prioritization or exclusion of beams 205 to be measured or reported may be based on antenna characteristics (e.g., antenna configurations) of the UE 115-*a*. For example, the UE 115-*a* may have one or more directional antennas pointed towards network entity 105-*b* (e.g., in a downward direction). As such, the UE 115-*a* may decide not to measure or report beam 205-*f*, and instead prioritize measurements and reports of beams 205-*g*, 205-*g* and 205-*i*.

In some examples, the UE 115-*a* may be configured with one or more height (e.g., altitude) thresholds. One or more beams 205 may be associated with height ranges defined by the height thresholds, so that the UE 115-*a* may select one or more beams to measure and/or report based on a current height (e.g., altitude) of the UE 115-*a* (e.g., determined using an altitude meter or indicated by the network entity 105). For example, the UE 115-*a* may measure one or more of a first, a second, and a third synchronization signal block (SSB) (e.g., where a SSB corresponds to a beam) when the current height is below a first height threshold, measure one or more of the second and third SSB when the current height is between the first height threshold and a second height threshold, and measure the third SSB when the current height is above the second height threshold. Additionally, or alternatively, the UE 115-*a* may be configured with zones (e.g., three-dimensional zones), for example, by configuring thresholds or parameters for latitude, longitude, and altitude. As such, the UE 115-*a* may select beams to measure and/or report based on a current zone that the UE 115-*a* is located in (e.g., determined using GPS or indicated by a network entity 105). These procedures are covered in greater detail below, with reference to FIG. 3.

In some cases, the UE 115-*a* may be configured (e.g., via RRC signaling) with one or more measurement objects (e.g., measID and measObjectID) that include parameters for event-based reporting. However, some values of the fields (e.g., measObjectID) may correspond to object configurations (e.g., measObjectEUTRA or measObjectNR) which may not have fields that may be relevant or related to the height of the UE 115-*a*. As such, the UE 115-*a* and network entities 105 may be configured with an object configuration (e.g., measObjectUAV or measObjectHeight) which may contain relevant parameters for a UE 115 to perform aerial beam measurement and reporting. For example, the object configuration may include fields related to a periodicity of position determination (e.g., global navigation satellite system (GNSS) acquisition, validity), need or no need of filtering measurements (e.g., filtering coefficients, etc.), altitude fields, time fields, zone fields, and other assistance information for measurements related to aerial UEs 115 (e.g., information aiding to determine a distance from a network entity 105).

In some examples, the UE 115-*a* may signal to a network entity 105 one or more capabilities to support one or more of the features described herein. For example, the UE 115-*b* may signal a capability to support beam measurement configurations based on a flight path 210, beam reporting configurations based on a flight path 210, height thresholds for use in measurement configurations or report configurations, three-dimensional zones for use in measurement configurations or report configurations, other features described herein, or a combination thereof. In some cases, configurations (e.g., measurement configurations, report configurations, height threshold configurations, three-dimensional zone configurations, etc.) transmitted by a network entity 105 to the UE 115-*a* may be transmitted using broadcast RRC (e.g., a system information block (SIB)), dedicated RRC, MAC-CE (using new or existing configurations), or using PHY signaling (e.g., downlink control information (DCI)).

Figure 3:
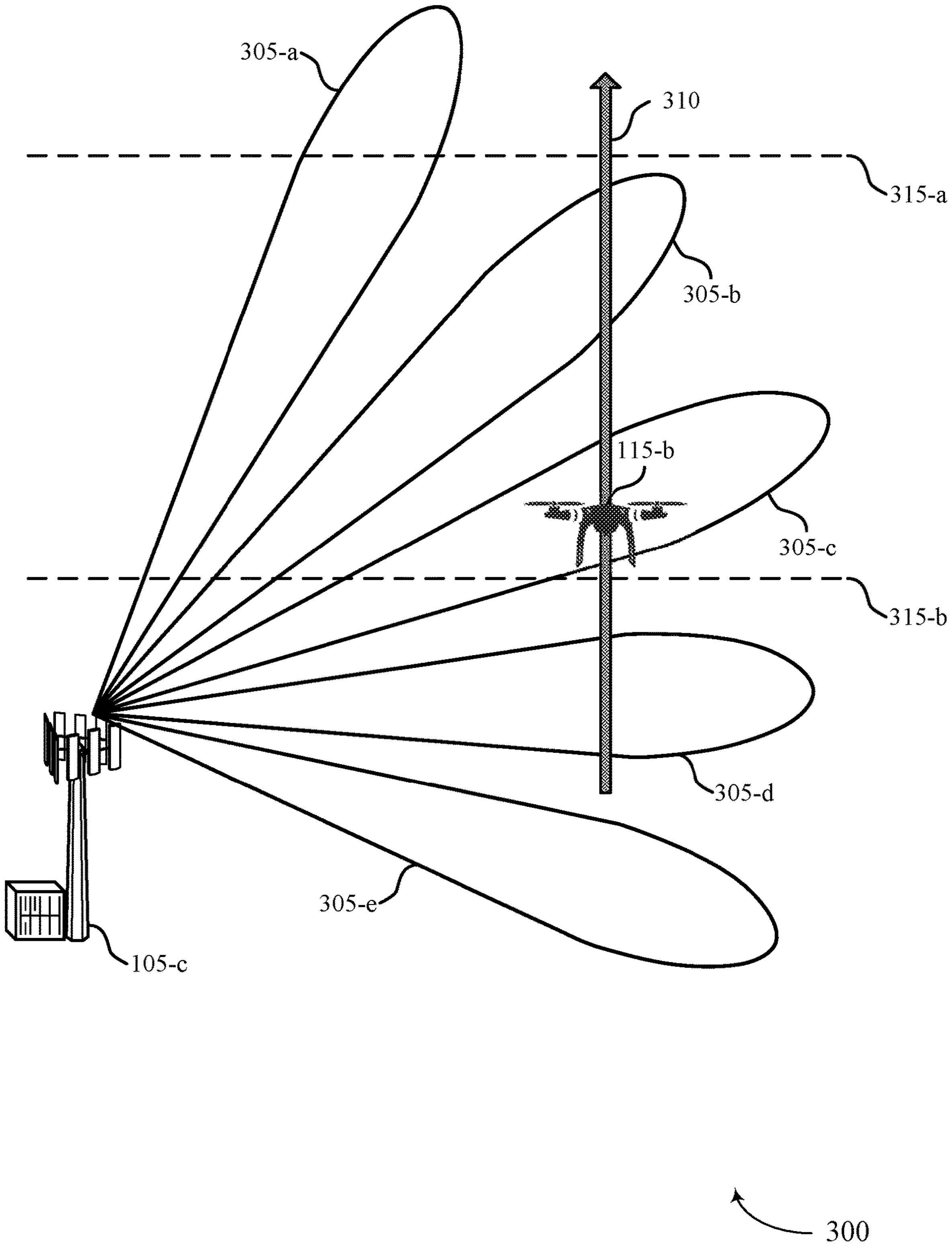
FIG. 3 illustrates an example of a wireless communications system that supports reducing measurement and reporting overhead for aerial vehicles in accordance with one or more aspects of the present disclosure.

FIG. 3 illustrates an example of a wireless communications system 300 that supports reducing measurement and reporting overhead for aerial vehicles in accordance with one or more aspects of the present disclosure. The wireless communications system 300 may be an example of wireless communications system 100 and wireless communications system 200 as described herein, with reference to FIGS. 1 and 2. For example, wireless communications system 300 may illustrate communications between a UE 115-*b* and network entity 105-*c*, which may be examples of corresponding devices as described herein, with reference to FIGS. 1 and 2. Similarly, FIG. 3 illustrates beams 305, such as beams 305-*a*, 305-*b*, 305-*c*, 305-*d*, and 305-*e* which may be examples of beams 205 as described herein, with reference to FIG. 2.

The UE 115-*b* may be configured (e.g., by network entity 105-*c*) with one or more height (e.g., altitude) thresholds 315 for beam measurements in one or more beam measurement configurations. For example, UE 115-*b* may be configured with height threshold 315-*a* and height threshold 315-*b*, which may define a high altitude and low altitude, respectively. In some examples, the height thresholds 315 may be reconfigured by a network entity 105 (e.g., using dedicated signaling, broadcast signaling, or MAC-CE). In some examples, the height thresholds 315 may be indicated by beam measurement configurations that are signaled to the UE by a network entity 105 (e.g., network entity 105-*c*).

The UE 115-*b* may select beams 305 to measure based on the height thresholds 315 and a current altitude or height of the UE 115-*b* (e.g., measured using an altitude meter). For example, the UE 115-*b* may measure beams 305-*c*, 305-*d*, and 305-*e* when the altitude (e.g., height) of the UE 115-*b* is below a height associated with height threshold 315-*b*, measure beams 305-*a*, 305-*b*, and 305-*c* when the UE 115-*b* is at an altitude above the height associated with height threshold 315-*b* and below a height associated with height threshold 315-*a*, and measure beam 305-*a* when the UE 115-*b* is at an altitude above the height associated with height threshold 315-*a*. A subset of beams 305 to be measured at height ranges associated with the height thresholds 315 may be decided (e.g., autonomously) by the UE 115-*b* based on received beam measurement configurations. Additionally, or alternatively, the network entity 105-*c* may configure and reconfigure a subset beams 305 to be measured at the height ranges associated with the height thresholds 315. For example, the network may configure or reconfigure the subset of beams 305 based on a height reported by the UE 115-*b*.

In some examples, the height ranges associated with the height thresholds 315 may be associated with beam measurement configurations. That is, the UE 115-*b* may report all beams that are configured for measurement at the current height range that the UE 115-*b* is located in. Alternatively, the UE 115-*b* may be configured (e.g., via beam measurement configurations) with additional height thresholds 315 for determining which beams to report. The additional height thresholds 315 may be different from the height thresholds 315-*a* and 315-*b* configured for beam 305 measurements. In some cases, the UE 115-*b* may report one or more beams with the highest or lowest measurement metrics (e.g., a beam with a highest signal strength, RSRP, or another parameter) within a height range that the UE 115-*b* is located in. In some examples, the UE 115-*b* reports a set of beam measurements that satisfy a threshold measurement (e.g., a threshold RSRP) for a given height or height range.

In some examples, the UE 115-*b* may be configured with three-dimensional zones (e.g., instead of height ranges alone) in one or more beam measurement configurations by configuring thresholds or parameters for latitude, longitude, and altitude. For example, the UE 115-*b* may be configured with a latitude range using two thresholds (e.g., $X_1$-$X_2$), a longitude range using another two thresholds (e.g., $Y_1$-$Y_2$), and an altitude range using a final two thresholds (e.g., $Z_1$-$Z_2$) for each three-dimensional zone. In some examples, the three-dimensional zones may be defined without disclosing locations of network entities 105 (e.g., to the UE 115-*b*). In some cases, each of the three-dimensional zones may be associated with an identifier (ID), such as a zone ID (e.g., three-dimensional zone ID). The network entity 105-*c* may configure the UE 115-*b* with the one or more three-dimensional zones using dedicated RRC signaling, broadcast RRC such as SIB, MAC-CE, or other signaling, for example.

The network entity 105-*c* may assign beam measurement configurations to the configured three-dimensional zones. For example, the network entity 105-*c* be aware of information about beams 305 and other network entities 105 based on deployment information (e.g., of a UE 115) and previous (e.g., historical) reporting of beam measurements by UE 115-*a* or other UEs 115 (e.g., aerial UEs 115). Accordingly, the network entity 105-*c* may assign beam measurement configurations to each of the three-dimensional zones which may configure the UE 115-*b* to measure and/or report specific beams 305 when the UE 115-*b* is located within a corresponding three-dimensional zone. For example, the UE 115-*a* may measure one or more of a first, second, and third SSB when the UE 115-*a* is located within a first three-dimensional zone, measure one or more of the second and third SSB when the UE 115-*a* is located within a second three-dimensional zone, and measure one or more of the third and a fourth SSB when the UE 115-*a* is located within a third three-dimensional zone.

The UE 115-*b* may determine one or more configurations to activate or deactivate according to the three-dimensional zone (e.g., or the zone ID) and a location of the UE 115-*b* (e.g., determined using GPS location). Additionally, or alternatively, the network entity 105-*c* may provide the UE 115-*b* with a zone ID corresponding to the three-dimensional zone to be used based on a determined location of the UE 115-*b* or a flight path 310 of the UE 115-*b*, which may reduce signaling overhead (e.g., using dedicated or broadcast signaling) as the network entity 105-*c* may provide a single zone ID.

In some examples, the three-dimensional zones associated with the beam measurement configurations may be associated with both measurement and reporting. That is, the UE 115-*b* may report all beams that are configured for measurement at the current three-dimensional zone that the UE 115-*b* is located in. Alternatively, the UE 115-*b* may be configured with additional three-dimensional zones corresponding to beam 305 reporting, which may be different from the three-dimensional zones configured for beam 305 measurements. In some cases, the UE 115-*b* may report one or more beams with highest or lowest measurement metrics (e.g., a beam with a highest signal strength, RSRP, or another parameter) within a three-dimensional zone that the UE 115-*b* is located in. In some examples, the UE 115-*b* reports a set of beam measurements that satisfy a threshold measurement (e.g., a threshold RSRP) for a given zone.

Figure 4:
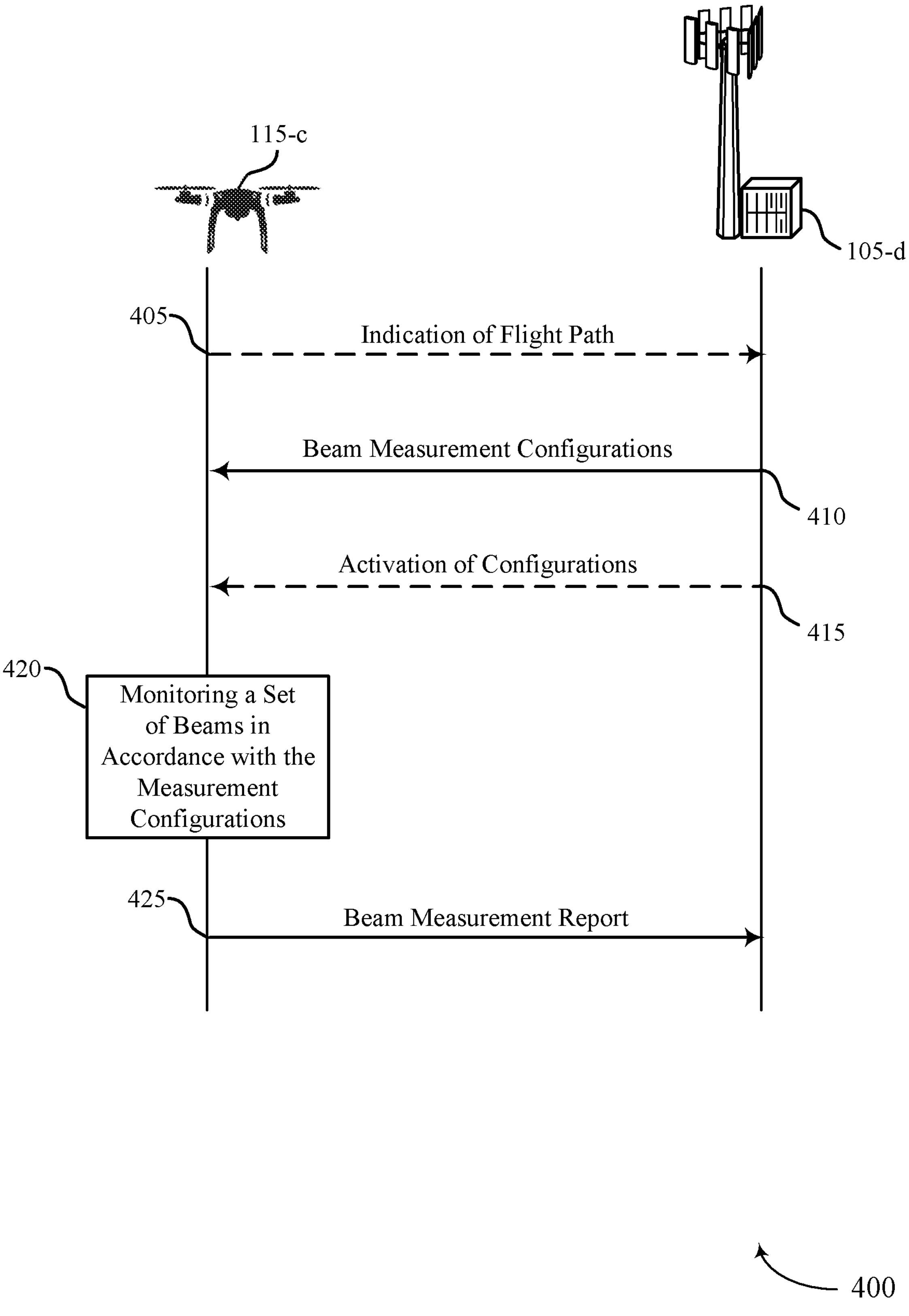
FIG. 4 illustrates an example of a process flow that supports reducing measurement and reporting overhead for aerial vehicles in accordance with one or more aspects of the present disclosure.

FIG. 4 illustrates an example of a process flow 400 that supports reducing measurement and reporting overhead for aerial vehicles in accordance with one or more aspects of the present disclosure. The process flow 400 may illustrate communications between a UE 115 *c* and network entity 105-*d*, which may be examples of corresponding devices as described herein, with reference to FIGS. 1-3. For example, the UE 115-*c* may be an example of an aerial UE 115-*c*, as described herein.

At 405, the UE 115-*c* may transmit an indication of a flight path associated with the UE 115-*c*. For example, the UE 115-*c* may estimate or be configured with flight path, which may include one or more projected time and locations of the UE 115-*c*, and transmit an indication of the flight path to the network entity 105-*d*. As such, the network entity 105-*d* may be aware of the one or more projected time and locations of the UE 115-*c*.

In some examples, the UE 115-*a* may transmit an indication of a capability of the UE 115-*c* of supporting beam measurement configurations that are based on a current time, a current location of the UE 115-*c*, or both. In some examples, the UE 115-*b* may signal the indication of the capability prior to transmitting an indication of a flight path.

At 410, the UE 115-*c* may receive a first control signaling, from the network entity 105-*d*, indicating a plurality of beam measurement configurations (e.g., beam measurement and, in some cases, beam reporting configurations) that the UE 115-*c* is to use for beam measurement and reporting associated with a plurality of beams. For example, the first control signaling may be a measurement object that indicates one or more of the plurality of beam measurement configurations and includes one or more fields associated with determining a subset of beam measurement configurations by the UE 115-*c*, and the one or more fields may be altitude fields, time fields, zone fields, or a combination thereof. The beam measurement configurations may each correspond to a location (e.g., along the flight path). For example, the beam measurement configurations may be based on the flight path of the UE 115-*c*. The network entity 105 may determine a time at which the UE 115-*c* may be at each location based on the flight path 210. As such, the network entity 105 may configure the UE 115-*c* to activate beam measurement configurations based on an absolute time or after the expiration of a timer, corresponding to a time at which the UE 115-*c* may be at a location associated with a measurement configuration or reporting configuration to be activated. For example, each beam measurement configuration may be associated with a time (e.g., or timer) at which the configuration is to become active at the UE 115-*c*, and, in some cases, the UE 115-*c* may deactivate previous configurations after activating a current configuration.

In some cases, the first control signaling may indicate that the plurality of beam measurement configurations are associated with respective altitude thresholds (e.g., height thresholds). Additionally, or alternatively, the first control signaling may indicate that the plurality of beam measurement configurations are associated with respective zone identifiers. For example, the zone identifiers may correspond to respective three-dimensional zones for the plurality of beam measurement configurations, for example, configured using respective thresholds for latitude, longitude, and altitude ranges.

At 415, the network entity 105-*d* may transmit a second control signaling to the UE 115-*c* to activate or deactivate a subset of beam measurement configurations (e.g., using MAC-CE). In some examples, the indication may be based on a current location (e.g., height or zone) of the UE 115-*c* determined by the network entity 105-*d* (e.g., using the flight path) or reported by the UE 115-*c*.

At 420, the UE 115-*c* may monitor a set of beams of the plurality of beams in accordance with a subset of beam measurement configurations of the plurality of beam measurement configurations. The subset of beam measurement configurations may be based on a current time, a current location (e.g., height or zone) of the UE 115-*c*, or both. For example, the subset of beam measurement configurations may be based on the current time relative to the flight path of the UE 115-*c*. In some examples, the UE 115-*c* may determine the subset of beam measurement configurations based on the altitude of the UE 115-*c* relative to an altitude threshold associated with the subset of beam measurement configurations. Additionally, or alternatively, the subset of beam measurement configurations may be based on a current zone (e.g., three-dimensional zone) in which the UE 115-*c* is operating corresponding to a configured zone identifier associated with the subset of beams. In some cases, the subset of beam measurement configurations may be based on the second control signaling, received from the network entity 105-*d*, activating a subset of beam measurement configurations.

At 425, the UE 115-*c* may transmit a measurement report indicating one or more measurements of a subset of beams of the monitored set of beams in accordance with the subset of beam measurement configurations. For example, the measurement report may indicate the one or more measurements associated with one or more beams selected based on a current time or the current time relative to the flight path of the UE 115-*c*, an antenna configuration of the UE 115-*c*, or both. The one or more beams may be selected based on an altitude of the aerial UE 115-*c* relative to an altitude threshold (e.g., corresponding to the subset of beam measurement configurations). For example, the subset of beam measurement configurations may be associated with an altitude range in which the UE 115-*c* is operating, and the one or more beams may correspond to the altitude range. Additionally, or alternatively, the one or more beams may be selected based on a zone in which the UE 115-*c* is operating, and the one or more beams may be associated with the subset of beam measurement configurations for the zone. In some cases, the one or more beams may be selected as being associated with a set of measurement metrics that are higher or lower than other measurement metrics (e.g., a highest signal strength, RSRP, RSRQ, or another parameter) of a plurality of beam measurements associated with the subset of beam configurations.

The first control signaling may indicate the UE 115-*c* of a plurality of beam measurement configurations, and the UE 115-*c* may determine beams to measure based on the beam measurement configuration. In some examples, the UE may autonomously select measured beams to report in the measurement report, or the UE may select measured beams to report in the measurement report based on the measurement configurations. Alternatively, the UE may receive one or more beam reporting configurations (e.g., in the first control signaling) and select measured beams to report in the measurement report according to one or more of the beam reporting configurations.

Figure 5:
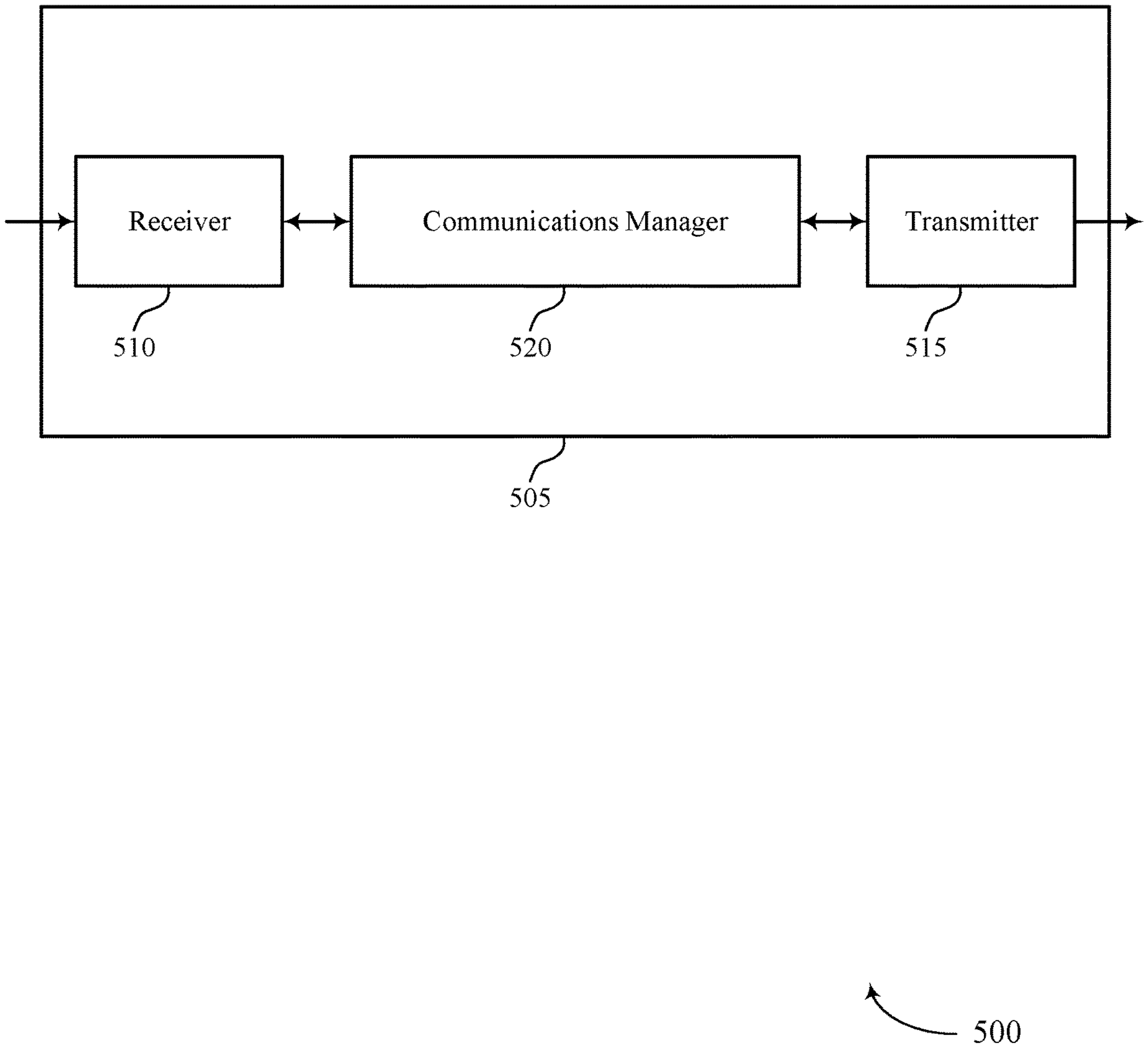
FIGS. 5 and 6 show diagrams of devices that support reducing measurement and reporting overhead for aerial vehicles in accordance with one or more aspects of the present disclosure.

FIG. 5 shows a diagram 500 of a device 505 that supports reducing measurement and reporting overhead for aerial vehicles in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reducing measurement and reporting overhead for aerial vehicles). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reducing measurement and reporting overhead for aerial vehicles). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reducing measurement and reporting overhead for aerial vehicles as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at an aerial UE in accordance with examples as disclosed herein. For example, the communications manager 520 may be configured as or otherwise support a means for receiving control signaling that indicates a set of multiple beam measurement configurations that the aerial UE is to use for beam measurement and reporting associated with a set of multiple beams. The communications manager 520 may be configured as or otherwise support a means for monitoring a set of beams of the set of multiple beams in accordance with a subset of beam measurement configurations of the set of multiple beam measurement configurations, the subset of beam measurement configurations being based on a current time, or a current location of the aerial UE, or both. The communications manager 520 may be configured as or otherwise support a means for transmitting a measurement report indicating one or more measurements of a subset of beams of the set of beams in accordance with the subset of beam measurement configurations.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and more efficient utilization of communication resources.

Figure 6:
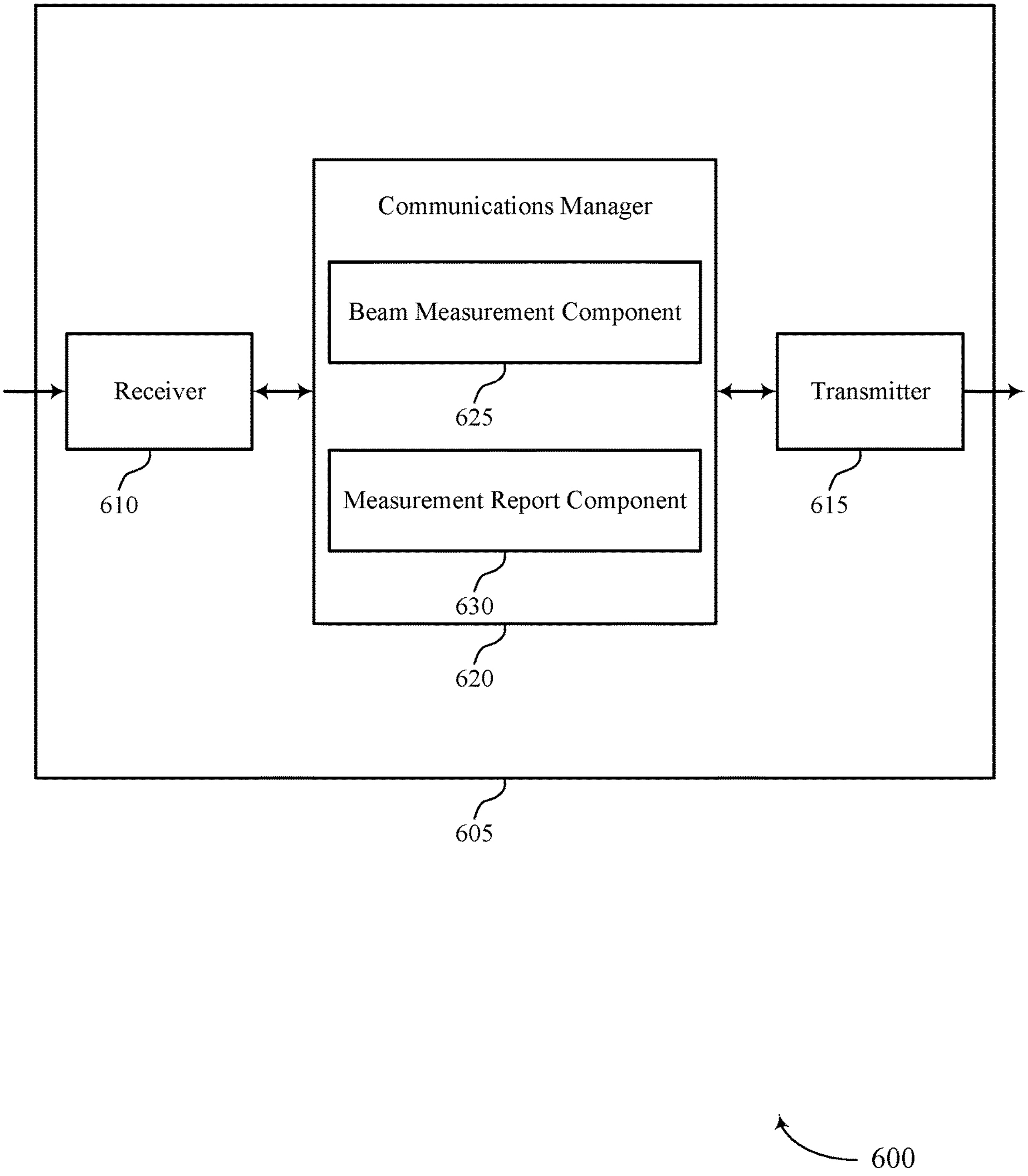

FIG. 6 shows a diagram 600 of a device 605 that supports reducing measurement and reporting overhead for aerial vehicles in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reducing measurement and reporting overhead for aerial vehicles). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reducing measurement and reporting overhead for aerial vehicles). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reducing measurement and reporting overhead for aerial vehicles as described herein. For example, the communications manager 620 may include a beam measurement component 625 *a* measurement report component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at an aerial UE in accordance with examples as disclosed herein. The beam measurement component 625 may be configured as or otherwise support a means for receiving control signaling that indicates a set of multiple beam measurement configurations that the aerial UE is to use for beam measurement and reporting associated with a set of multiple beams. The beam measurement component 625 may be configured as or otherwise support a means for monitoring a set of beams of the set of multiple beams in accordance with a subset of beam measurement configurations of the set of multiple beam measurement configurations, the subset of beam measurement configurations being based on a current time, or a current location of the aerial UE, or both. The measurement report component 630 may be configured as or otherwise support a means for transmitting a measurement report indicating one or more measurements of a subset of beams of the set of beams in accordance with the subset of beam measurement configurations.

Figure 7:
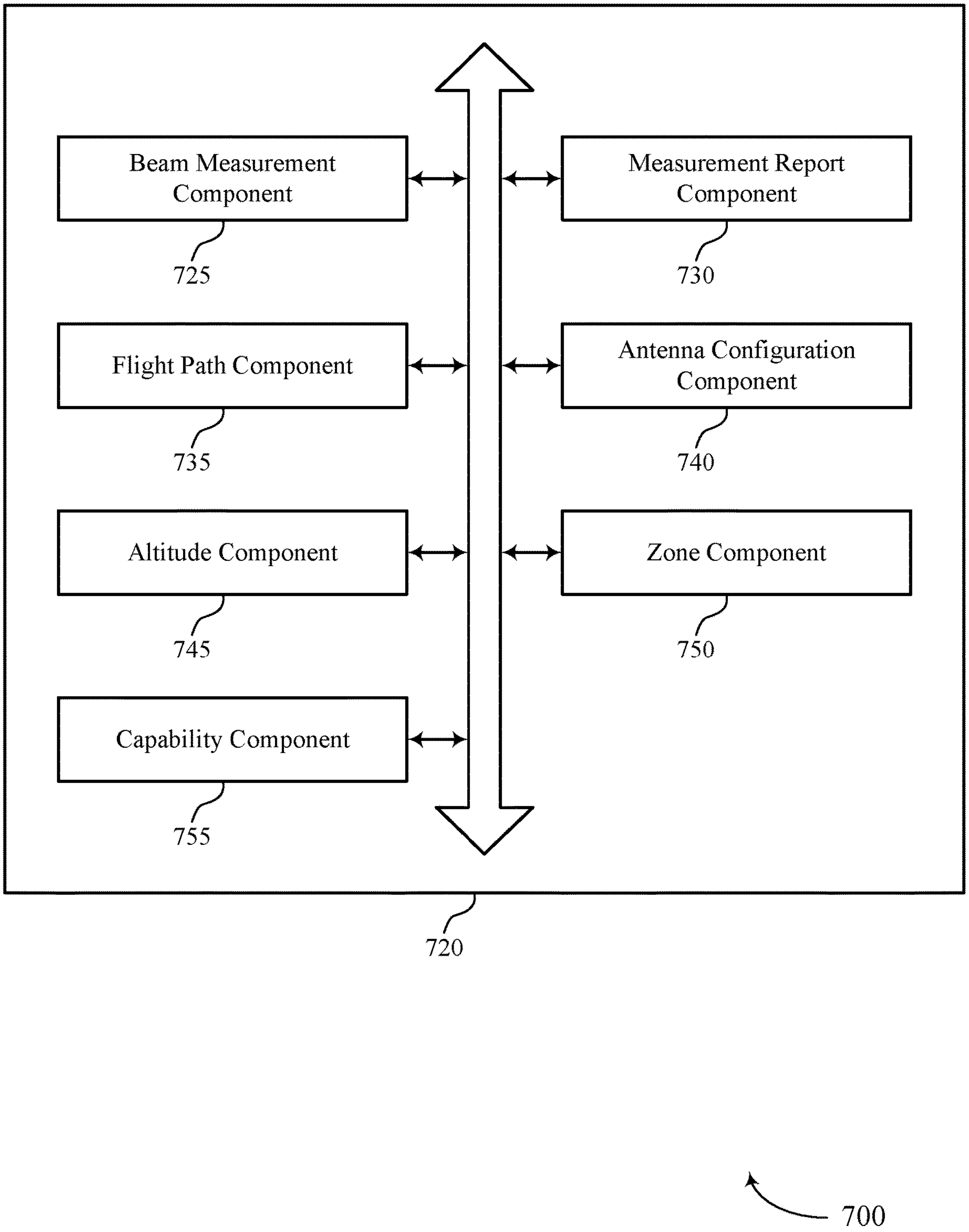
FIG. 7 shows a diagram of a communications manager that supports reducing measurement and reporting overhead for aerial vehicles in accordance with one or more aspects of the present disclosure.

FIG. 7 shows a diagram 700 of a communications manager 720 that supports reducing measurement and reporting overhead for aerial vehicles in accordance with one or more aspects of the present disclosure. The communications manager 720 may be an example of aspects of a communications manager 520, a communications manager 620, or both, as described herein. The communications manager 720, or various components thereof, may be an example of means for performing various aspects of reducing measurement and reporting overhead for aerial vehicles as described herein. For example, the communications manager 720 may include a beam measurement component 725, a measurement report component 730, a flight path component 735, an antenna configuration component 740, an altitude component 745, a zone component 750, a capability component 755, or any combination thereof. Each of these components may communicate, directly or indirectly, with one another (e.g., via one or more buses).

The communications manager 720 may support wireless communication at an aerial UE in accordance with examples as disclosed herein. The beam measurement component 725 may be configured as or otherwise support a means for receiving control signaling that indicates a set of multiple beam measurement configurations that the aerial UE is to use for beam measurement and reporting associated with a set of multiple beams. In some examples, the beam measurement component 725 may be configured as or otherwise support a means for monitoring a set of beams of the set of multiple beams in accordance with a subset of beam measurement configurations of the set of multiple beam measurement configurations, the subset of beam measurement configurations being based on a current time, or a current location of the aerial UE, or both. The measurement report component 730 may be configured as or otherwise support a means for transmitting a measurement report indicating one or more measurements of a subset of beams of the set of beams in accordance with the subset of beam measurement configurations.

In some examples, the flight path component 735 may be configured as or otherwise support a means for transmitting an indication of a flight path associated with the aerial UE, where the control signaling that indicates the set of multiple beam measurement configurations is received based on the flight path.

In some examples, to support monitoring the set of beams, the flight path component 735 may be configured as or otherwise support a means for monitoring the set of beams in accordance with the subset of beam measurement configurations that is based on the current time relative to a flight path associated with the aerial UE.

In some examples, the beam measurement component 725 may be configured as or otherwise support a means for receiving control signaling that activates the subset of beam measurement configurations, where monitoring the set of beams is based at least part on the activated subset of beam measurement configurations.

In some examples, to support transmitting the measurement report, the flight path component 735 may be configured as or otherwise support a means for transmitting the measurement report that indicates the one or more measurements associated with one or more beams selected based on the current time or the current time relative to a flight path associated with the aerial UE.

In some examples, to support transmitting the measurement report, the antenna configuration component 740 may be configured as or otherwise support a means for transmitting the measurement report that indicates the one or more measurements associated with one or more beams selected based on an antenna configuration of the aerial UE.

In some examples, the altitude component 745 may be configured as or otherwise support a means for monitoring the set of beams in accordance with the subset of beam measurement configurations that is based on the current location, where the current location is an altitude of the aerial UE.

In some examples, the altitude component 745 may be configured as or otherwise support a means for determining the beam measurement configurations based on the altitude of the aerial UE relative to an altitude threshold.

In some examples, to support receiving the control signaling, the altitude component 745 may be configured as or otherwise support a means for receiving the control signaling that indicates the set of multiple beam measurement configurations that are associated with respective altitude thresholds that are to be used by the aerial UE to determine the subset of beam measurement configurations for beam measurement and reporting.

In some examples, the altitude component 745 may be configured as or otherwise support a means for transmitting the measurement report that indicates the one or more measurements associated with one or more beams selected based on an altitude of the aerial UE relative to an altitude threshold.

In some examples, the one or more beams are associated with the subset of beam measurement configurations associated with an altitude range in which the aerial UE is operating. In some examples, the one or more beams are selected as being associated with a set of measurement metrics that are higher or lower than other measurement metrics of a set of multiple beam measurements associated with the subset of beam measurement configurations.

In some examples, the zone component 750 may be configured as or otherwise support a means for monitoring the set of beams in accordance with the beam measurement configurations that is based on the current location, where the current location is a zone identifier of a zone in which the aerial UE is operating.

In some examples, to support receiving the control signaling, the zone component 750 may be configured as or otherwise support a means for receiving the control signaling that indicates the set of multiple beam measurement configurations that are associated with respective zone identifiers that are to be used by the aerial UE to determine the subset of beam measurement configurations for beam measurement and reporting.

In some examples, the zone component 750 may be configured as or otherwise support a means for receiving control signaling that activates the subset of beam measurement configurations based on a current zone in which the UE is operating.

In some examples, the measurement report component 730 may be configured as or otherwise support a means for transmitting the measurement report that indicates the one or more measurements associated with one or more beams selected based on a zone in which the aerial UE is operating.

In some examples, the one or more beams are associated with the subset of beam measurement configurations for the zone. In some examples, the one or more beams are associated with a set of measurement metrics that are higher or lower than other measurement metrics of a set of multiple beam measurements associated with the subset of beam measurement configurations for the zone.

In some examples, to support receiving the control signaling, the beam measurement component 725 may be configured as or otherwise support a means for receiving a measurement object that indicates one or more of the set of multiple beam measurement configurations and includes one or more fields associated with determining the subset of beam measurement configurations by the aerial UE. In some examples, the measurement object includes an altitude fields, a time field, a zone field, or a combination thereof.

In some examples, the capability component 755 may be configured as or otherwise support a means for transmitting an indication of a capability of the aerial UE of supporting beam measurement configurations that are based on a current time, or a current location of the aerial UE, or both, where the control signaling is received based on transmitting the indication.

Figure 8:
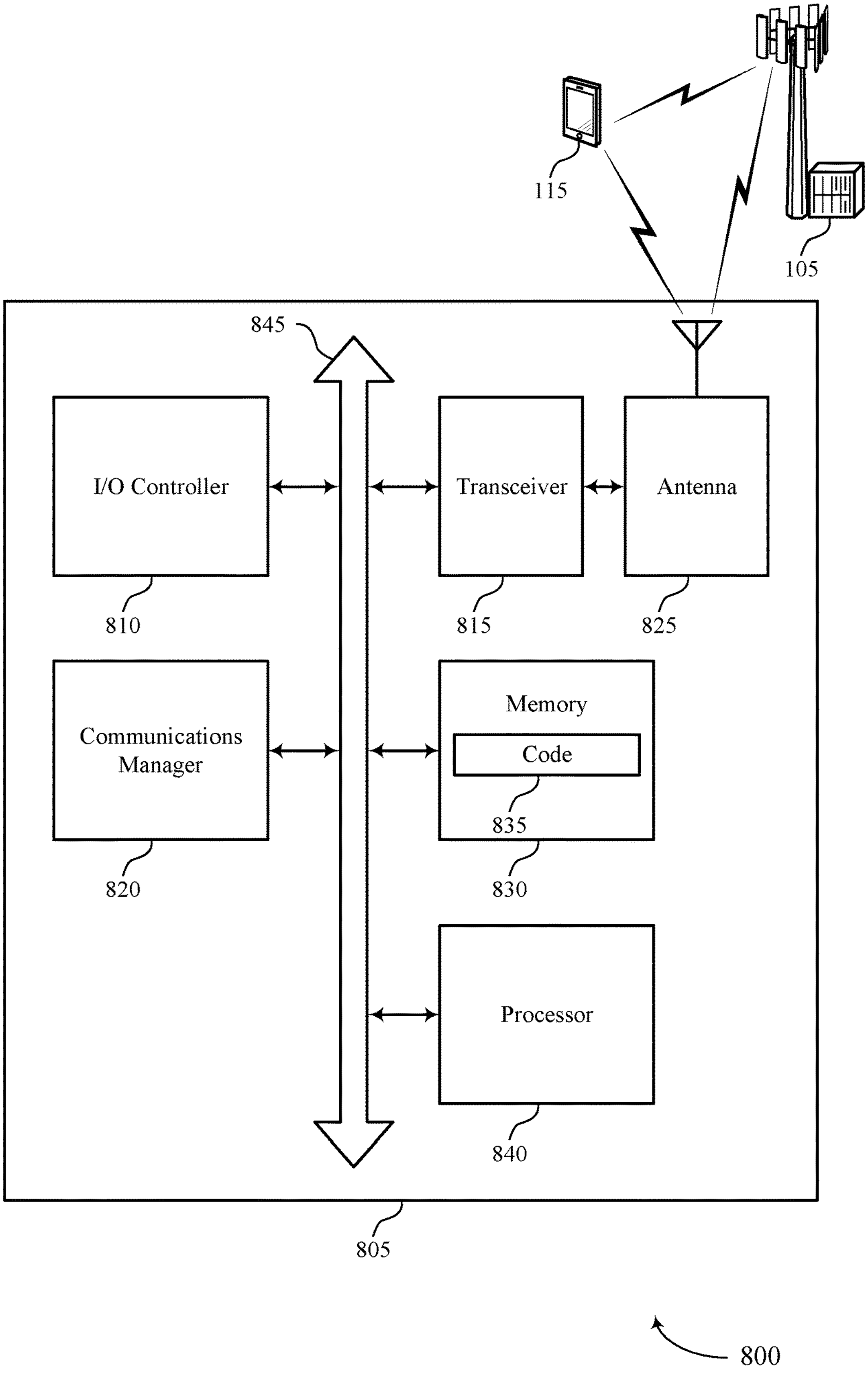
FIG. 8 shows a diagram of a system including a device that supports reducing measurement and reporting overhead for aerial vehicles in accordance with one or more aspects of the present disclosure.

FIG. 8 shows a diagram of a system 800 including a device 805 that supports reducing measurement and reporting overhead for aerial vehicles in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reducing measurement and reporting overhead for aerial vehicles). For example, the device 805 or a component of the device 805 may include a processor 840 and memory 830 coupled with or to the processor 840, the processor 840 and memory 830 configured to perform various functions described herein.

The communications manager 820 may support wireless communication at an aerial UE in accordance with examples as disclosed herein. For example, the communications manager 820 may be configured as or otherwise support a means for receiving control signaling that indicates a set of multiple beam measurement configurations that the aerial UE is to use for beam measurement and reporting associated with a set of multiple beams. The communications manager 820 may be configured as or otherwise support a means for monitoring a set of beams of the set of multiple beams in accordance with a subset of beam measurement configurations of the set of multiple beam measurement configurations, the subset of beam measurement configurations being based on a current time, or a current location of the aerial UE, or both. The communications manager 820 may be configured as or otherwise support a means for transmitting a measurement report indicating one or more measurements of a subset of beams of the set of beams in accordance with the subset of beam measurement configurations.

By including or configuring the communications manager 820 in accordance with examples as described herein, the device 805 may support techniques for improved communication reliability, reduced latency, reduced power consumption, more efficient utilization of communication resources, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reducing measurement and reporting overhead for aerial vehicles as described herein, or the processor 840 and the memory 830 may be otherwise configured to perform or support such operations.

Figure 9:
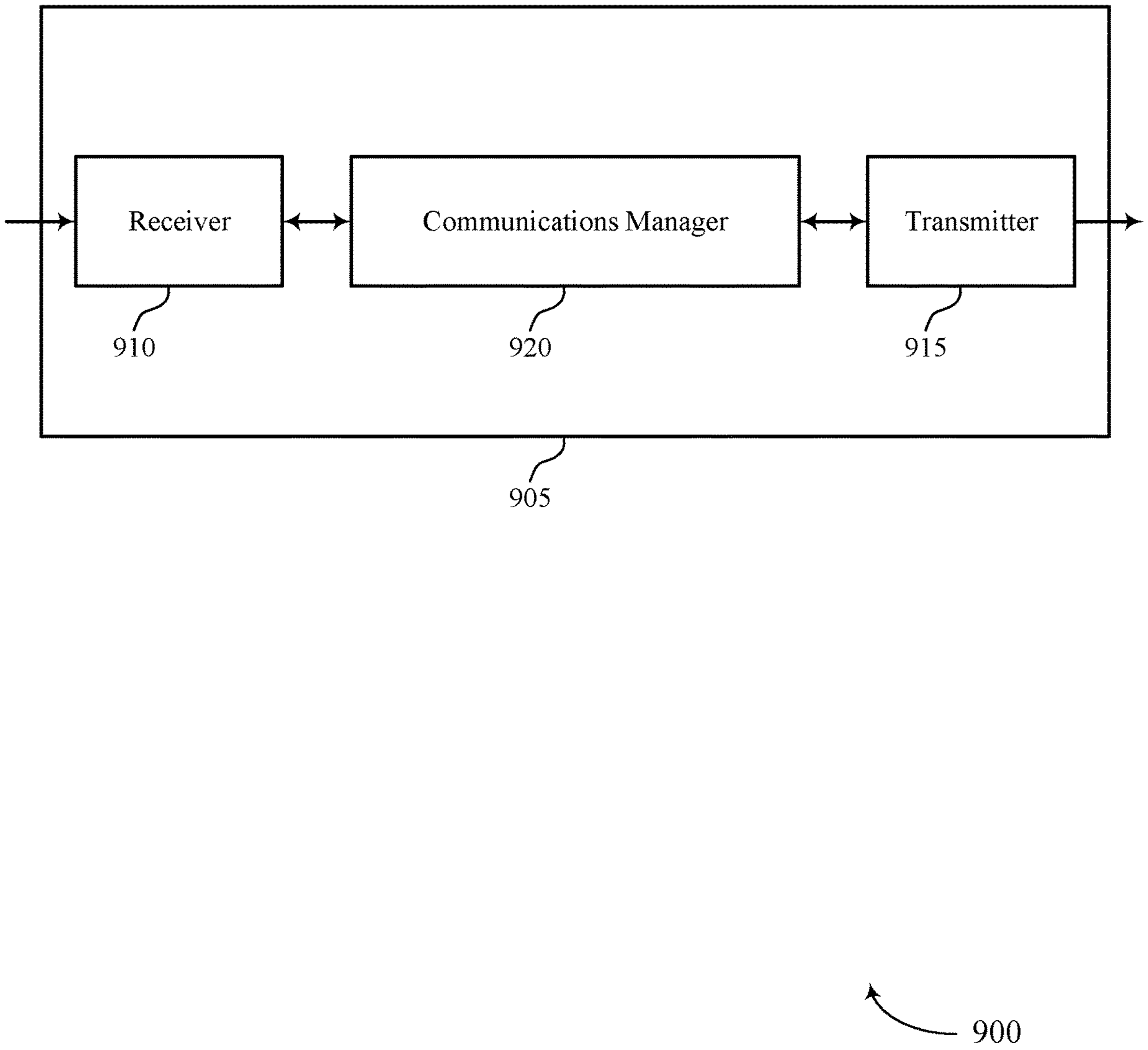
FIGS. 9 and 10 show diagrams of devices that support reducing measurement and reporting overhead for aerial vehicles in accordance with one or more aspects of the present disclosure.

FIG. 9 shows a diagram 900 of a device 905 that supports reducing measurement and reporting overhead for aerial vehicles in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reducing measurement and reporting overhead for aerial vehicles as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE. The communications manager 920 may be configured as or otherwise support a means for receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption and more efficient utilization of communication resources.

Figure 10:
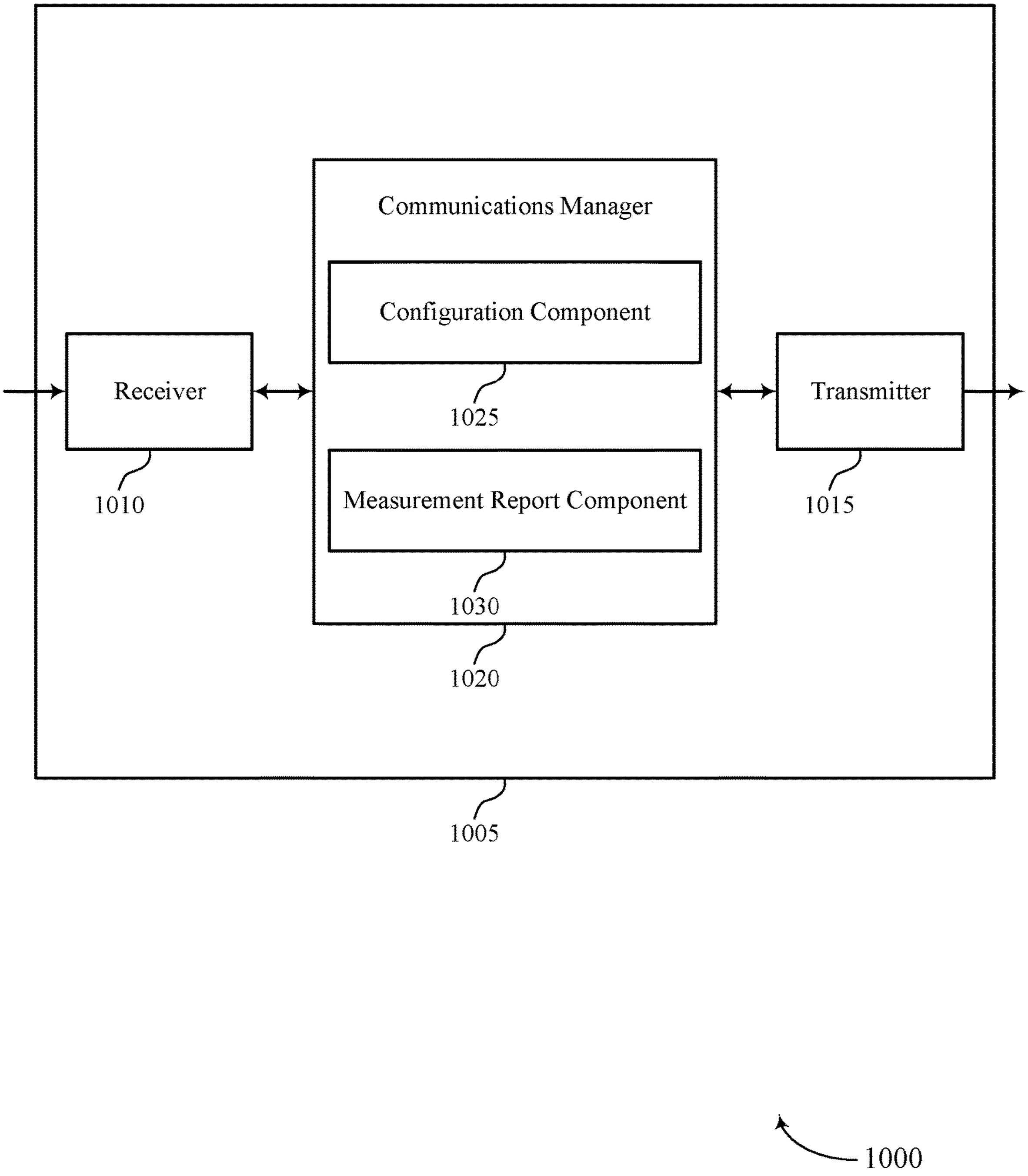

FIG. 10 shows a diagram 1000 of a device 1005 that supports reducing measurement and reporting overhead for aerial vehicles in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reducing measurement and reporting overhead for aerial vehicles as described herein. For example, the communications manager 1020 may include a configuration component 1025 *a* measurement report component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration component 1025 may be configured as or otherwise support a means for transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE. The measurement report component 1030 may be configured as or otherwise support a means for receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

Figure 11:
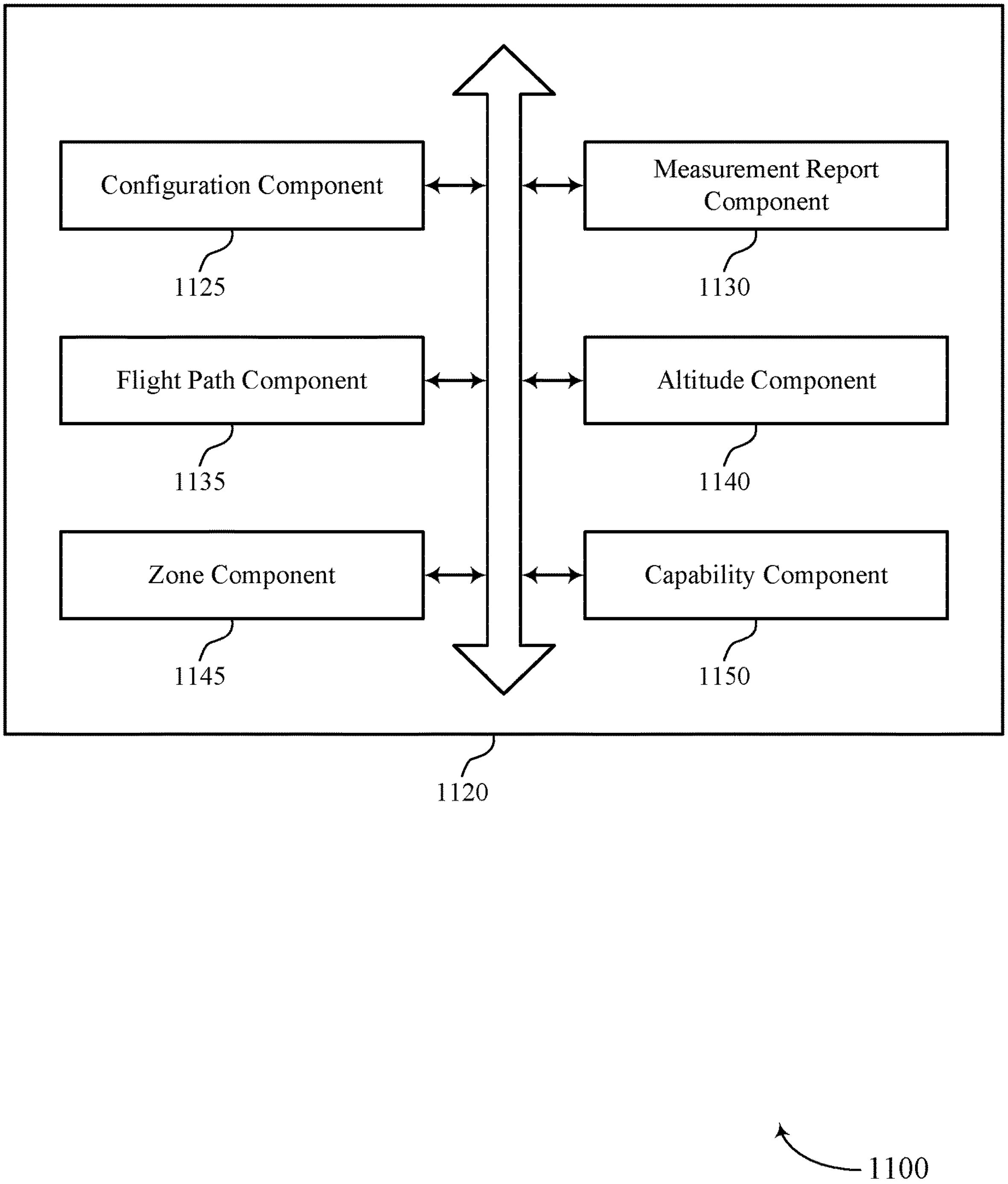
FIG. 11 shows a diagram of a communications manager that supports reducing measurement and reporting overhead for aerial vehicles in accordance with one or more aspects of the present disclosure.

FIG. 11 shows a diagram 1100 of a communications manager 1120 that supports reducing measurement and reporting overhead for aerial vehicles in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reducing measurement and reporting overhead for aerial vehicles as described herein. For example, the communications manager 1120 may include a configuration component 1125, a measurement report component 1130, a flight path component 1135, an altitude component 1140, a zone component 1145, a capability component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE. The measurement report component 1130 may be configured as or otherwise support a means for receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

In some examples, the flight path component 1135 may be configured as or otherwise support a means for receiving an indication of a flight path associated with the aerial UE, where the set of multiple beam measurement configurations is based on the flight path.

In some examples, the configuration component 1125 may be configured as or otherwise support a means for transmitting control signaling that activates the subset of beam measurement configurations.

In some examples, the measurement report component 1130 may be configured as or otherwise support a means for receiving the measurement report that indicates the one or more measurements associated with one or more beams selected based on the current time or the current time relative to a flight path associated with the aerial UE.

In some examples, the measurement report component 1130 may be configured as or otherwise support a means for receiving the measurement report that indicates the one or more measurements associated with one or more beams selected based on an antenna configuration of the aerial UE.

In some examples, to support transmitting the control signaling, the configuration component 1125 may be configured as or otherwise support a means for transmitting the control signaling that indicates the set of multiple beam measurement configurations that are associated with respective altitude thresholds that are to be used by the aerial UE to determine the subset of beam measurement configurations for beam measurement and reporting.

In some examples, to support receiving the measurement report, the altitude component 1140 may be configured as or otherwise support a means for receiving the measurement report that indicates the one or more measurements associated with one or more beams that are based least in part on an altitude of the aerial UE relative to an altitude threshold.

In some examples, the one or more beams are associated with the subset of beam measurement configurations for an altitude range. In some examples, the one or more beams are associated with a set of measurement metrics that are higher or lower than other measurement metrics of a set of multiple beam measurements associated with the subset of beam measurement configurations.

In some examples, to support transmitting the control signaling, the zone component 1145 may be configured as or otherwise support a means for transmitting the control signaling that indicates the set of multiple beam measurement configurations that are associated with respective zone identifiers that are to be used by the aerial UE to determine the subset of beam measurement configurations for beam measurement and reporting.

In some examples, the zone component 1145 may be configured as or otherwise support a means for transmitting control signaling that activates the subset of beam measurement conjurations based on a current zone in which the UE is operating.

In some examples, the zone component 1145 may be configured as or otherwise support a means for receiving the measurement report that indicates the one or more measurements associated with one or more beams selected based on a zone in which the aerial UE is operating.

In some examples, the one or more beams are associated with the subset of beam measurement configurations for the zone. In some examples, the one or more beams are associated with a set of measurement metrics that are higher or lower than other measurement metrics of a set of multiple beam measurements associated with the subset of beam measurement configurations for the zone.

In some examples, to support transmitting the control signaling, the configuration component 1125 may be configured as or otherwise support a means for transmitting a measurement object that indicates one or more of the set of multiple beam measurement configurations and includes one or more fields associated with determining the subset of beam measurement configurations by the aerial UE. In some examples, the measurement object includes an altitude fields, a time field, a zone field, or a combination thereof.

In some examples, the capability component 1150 may be configured as or otherwise support a means for receiving an indication of a capability of the aerial UE of supporting beam measurement configurations that are based on a current time, or a current location of the aerial UE, or both, where the control signaling is transmitted based on receiving the indication.

Figure 12:
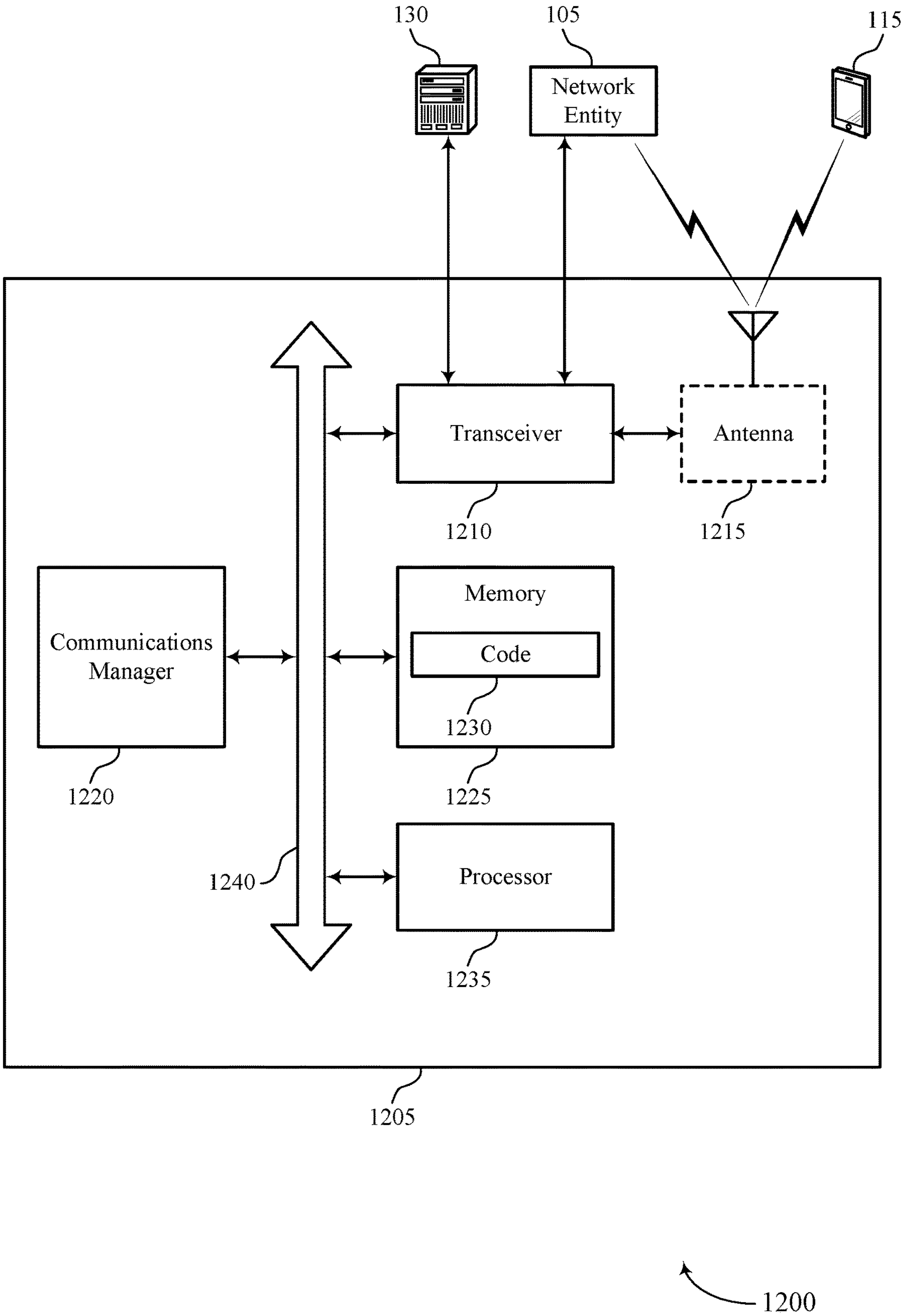
FIG. 12 shows a diagram of a system including a device that supports reducing measurement and reporting overhead for aerial vehicles in accordance with one or more aspects of the present disclosure.

FIG. 12 shows a diagram of a system 1200 including a device 1205 that supports reducing measurement and reporting overhead for aerial vehicles in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting reducing measurement and reporting overhead for aerial vehicles). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE. The communications manager 1220 may be configured as or otherwise support a means for receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE.

By including or configuring the communications manager 1220 in accordance with examples as described herein, the device 1205 may support techniques for improved communication reliability, reduced latency, reduced power consumption, more efficient utilization of communication resources, and longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of reducing measurement and reporting overhead for aerial vehicles as described herein, or the processor 1235 and the memory 1225 may be otherwise configured to perform or support such operations.

Figure 13:
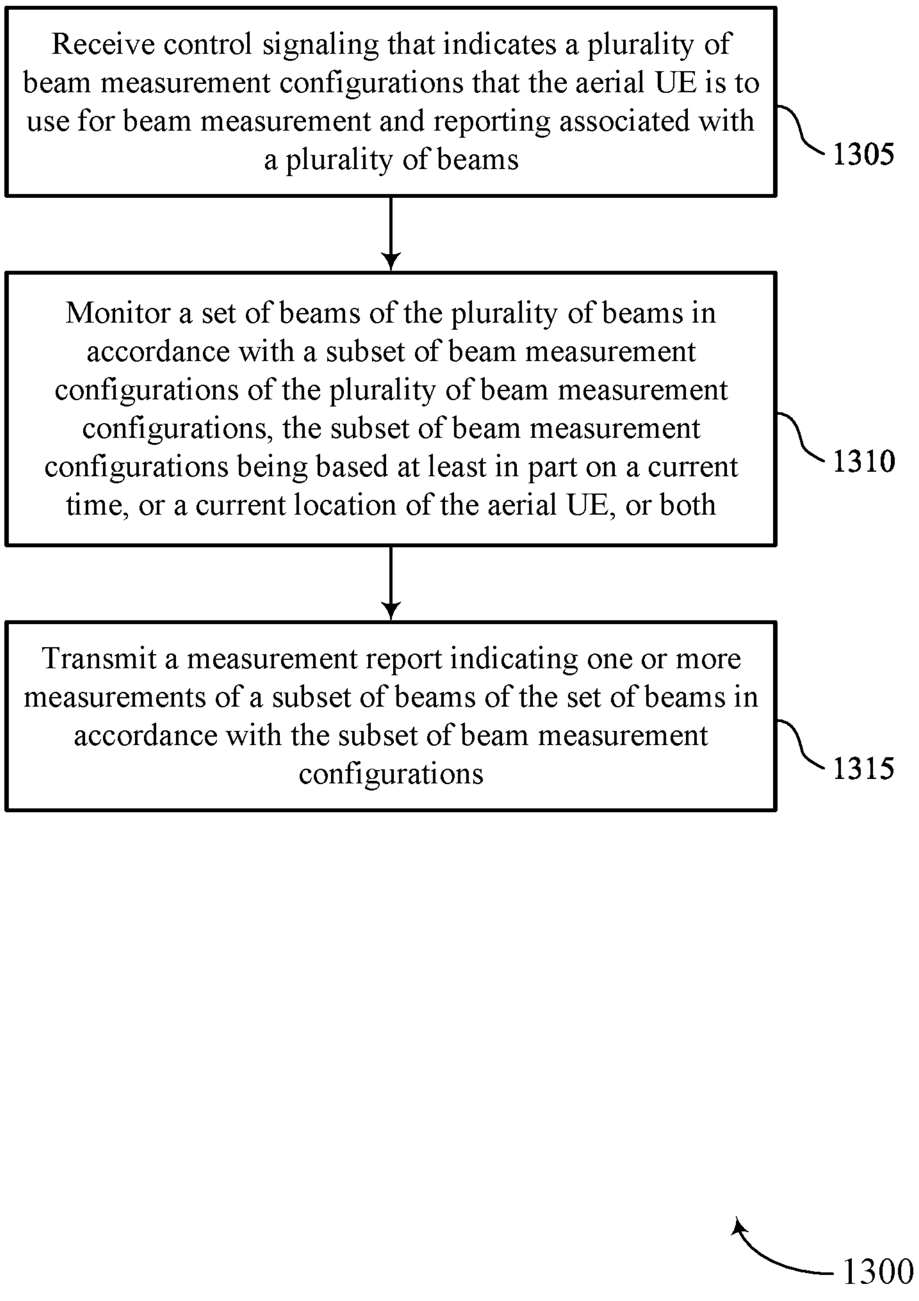

FIG. 13 shows a flowchart illustrating a method 1300 that supports reducing measurement and reporting overhead for aerial vehicles in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling that indicates a set of multiple beam measurement configurations that the aerial UE is to use for beam measurement and reporting associated with a set of multiple beams. The operations of 1305 may be performed in accordance with examples as disclosed herein. In some examples, aspects of the operations of 1305 may be performed by a beam measurement component 725 as described with reference to FIG. 7.

At 1310, the method may include monitoring a set of beams of the set of multiple beams in accordance with a subset of beam measurement configurations of the set of multiple beam measurement configurations, the subset of beam measurement configurations being based on a current time, or a current location of the aerial UE, or both. The operations of 1310 may be performed in accordance with examples as disclosed herein. In some examples, aspects of the operations of 1310 may be performed by a beam measurement component 725 as described with reference to FIG. 7.

At 1315, the method may include transmitting a measurement report indicating one or more measurements of a subset of beams of the set of beams in accordance with the subset of beam measurement configurations. The operations of 1315 may be performed in accordance with examples as disclosed herein. In some examples, aspects of the operations of 1315 may be performed by a measurement report component 730 as described with reference to FIG. 7.

FIG. 14 shows a flowchart illustrating a method 1400 that supports reducing measurement and reporting overhead for aerial vehicles in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling that indicates a set of multiple beam measurement configurations that an aerial UE is to use for beam measurement and reporting associated with a set of multiple beams, each of the set of multiple beam measurement configurations corresponding to at least one of a time period or a location of the aerial UE. The operations of 1405 may be performed in accordance with examples as disclosed herein. In some examples, aspects of the operations of 1405 may be performed by a configuration component 1125 as described with reference to FIG. 11.

At 1410, the method may include receiving a measurement report including indications of one or more measurements of a subset of beams of the set of multiple beams in accordance with a subset of beam measurement configurations of the set of multiple beam measurement configurations, where the subset of beams and the subset of beam measurement configurations are based on a location of the aerial UE or a current time associated with the aerial UE. The operations of 1410 may be performed in accordance with examples as disclosed herein. In some examples, aspects of the operations of 1410 may be performed by a measurement report component 1130 as described with reference to FIG. 11.

The following provides an overview of aspects of the present disclosure:

Aspect 1: A method for wireless communication at an aerial UE, comprising: receiving control signaling that indicates a plurality of beam measurement configurations that the aerial UE is to use for beam measurement and reporting associated with a plurality of beams; monitoring a set of beams of the plurality of beams in accordance with a subset of beam measurement configurations of the plurality of beam measurement configurations, the subset of beam measurement configurations being based at least in part on a current time, or a current location of the aerial UE, or both; and transmitting a measurement report indicating one or more measurements of a subset of beams of the set of beams in accordance with the subset of beam measurement configurations.

Aspect 2: The method of aspect 1, further comprising: transmitting an indication of a flight path associated with the aerial UE, wherein the control signaling that indicates the plurality of beam measurement configurations is received based at least in part on the flight path.

Aspect 3: The method of any of aspects 1 through 2, wherein monitoring the set of beams comprises: monitoring the set of beams in accordance with the subset of beam measurement configurations that is based at least in part on the current time relative to a flight path associated with the aerial UE.

Aspect 4: The method of any of aspects 1 through 3, further comprising: receiving control signaling that activates the subset of beam measurement configurations, wherein monitoring the set of beams is based at least part on the activated subset of beam measurement configurations.

Aspect 5: The method of any of aspects 1 through 4, wherein transmitting the measurement report comprises: transmitting the measurement report that indicates the one or more measurements associated with one or more beams selected based at least in part on the current time or the current time relative to a flight path associated with the aerial UE.

Aspect 6: The method of any of aspects 1 through 5, wherein transmitting the measurement report comprises: transmitting the measurement report that indicates the one or more measurements associated with one or more beams selected based at least in part on an antenna configuration of the aerial UE.

Aspect 7: The method of any of aspects 1 through 6, further comprising: monitoring the set of beams in accordance with the subset of beam measurement configurations that is based at least in part on the current location, wherein the current location is an altitude of the aerial UE.

Aspect 8: The method of aspect 7, further comprising: determining the beam measurement configurations based at least in part on the altitude of the aerial UE relative to an altitude threshold.

Aspect 9: The method of any of aspects 1 through 8, wherein receiving the control signaling comprises: receiving the control signaling that indicates the plurality of beam measurement configurations that are associated with respective altitude thresholds that are to be used by the aerial UE to determine the subset of beam measurement configurations for beam measurement and reporting.

Aspect 10: The method of any of aspects 1 through 9, further comprising: transmitting the measurement report that indicates the one or more measurements associated with one or more beams selected based at least in part on an altitude of the aerial UE relative to an altitude threshold.

Aspect 11: The method of aspect 10, wherein the one or more beams are associated with the subset of beam measurement configurations associated with an altitude range in which the aerial UE is operating.

Aspect 12: The method of any of aspects 10 through 11, wherein the one or more beams are selected as being associated with a set of measurement metrics that are higher or lower than other measurement metrics of a plurality of beam measurements associated with the subset of beam measurement configurations.

Aspect 13: The method of any of aspects 1 through 12, further comprising: monitoring the set of beams in accordance with the beam measurement configurations that is based at least in part on the current location, wherein the current location is a zone identifier of a zone in which the aerial UE is operating.

Aspect 14: The method of any of aspects 1 through 13, wherein receiving the control signaling comprises: receiving the control signaling that indicates the plurality of beam measurement configurations that are associated with respective zone identifiers that are to be used by the aerial UE to determine the subset of beam measurement configurations for beam measurement and reporting.

Aspect 15: The method of any of aspects 1 through 14, further comprising: receiving control signaling that activates the subset of beam measurement configurations based at least in part on a current zone in which the UE is operating.

Aspect 16: The method of any of aspects 1 through 15, further comprising: transmitting the measurement report that indicates the one or more measurements associated with one or more beams selected based at least in part on a zone in which the aerial UE is operating.

Aspect 17: The method of aspect 16, wherein the one or more beams are associated with the subset of beam measurement configurations for the zone.

Aspect 18: The method of any of aspects 16 through 17, wherein the one or more beams are associated with a set of measurement metrics that are higher or lower than other measurement metrics of a plurality of beam measurements associated with the subset of beam measurement configurations for the zone.

Aspect 19: The method of any of aspects 1 through 18, wherein receiving the control signaling comprises: receiving a measurement object that indicates one or more of the plurality of beam measurement configurations and includes one or more fields associated with determining the subset of beam measurement configurations by the aerial UE.

Aspect 20: The method of aspect 19, wherein the measurement object includes an altitude fields, a time field, a zone field, or a combination thereof.

Aspect 21: The method of any of aspects 1 through 20, further comprising: transmitting an indication of a capability of the aerial UE of supporting beam measurement configurations that are based on a current time, or a current location of the aerial UE, or both, wherein the control signaling is received based at least in part on transmitting the indication.

Aspect 22: A method for wireless communication at a network entity, comprising: transmitting control signaling that indicates a plurality of beam measurement configurations that an aerial UE is to use for beam measurement and reporting associated with a plurality of beams, each of the plurality of beam measurement configurations corresponding to at least one of a time period or a location of the aerial UE; and receiving a measurement report including indications of one or more measurements of a subset of beams of the plurality of beams in accordance with a subset of beam measurement configurations of the plurality of beam measurement configurations, wherein the subset of beams and the subset of beam measurement configurations are based at least in part on a location of the aerial UE or a current time associated with the aerial UE.

Aspect 23: The method of aspect 22, further comprising: receiving an indication of a flight path associated with the aerial UE, wherein the plurality of beam measurement configurations is based at least in part on the flight path.

Aspect 24: The method of any of aspects 22 through 23, further comprising: transmitting control signaling that activates the subset of beam measurement configurations.

Aspect 25: The method of any of aspects 22 through 24, further comprising: receiving the measurement report that indicates the one or more measurements associated with one or more beams selected based at least in part on the current time or the current time relative to a flight path associated with the aerial UE.

Aspect 26: The method of any of aspects 22 through 25, further comprising: receiving the measurement report that indicates the one or more measurements associated with one or more beams selected based at least in part on an antenna configuration of the aerial UE.

Aspect 27: The method of any of aspects 22 through 26, wherein transmitting the control signaling comprises: transmitting the control signaling that indicates the plurality of beam measurement configurations that are associated with respective altitude thresholds that are to be used by the aerial UE to determine the subset of beam measurement configurations for beam measurement and reporting.

Aspect 28: The method of any of aspects 22 through 27, wherein receiving the measurement report comprises: receiving the measurement report that indicates the one or more measurements associated with one or more beams that are based least in part on an altitude of the aerial UE relative to an altitude threshold.

Aspect 29: The method of aspect 28, wherein the one or more beams are associated with the subset of beam measurement configurations for an altitude range.

Aspect 30: The method of any of aspects 28 through 29, wherein the one or more beams are associated with a set of higher measurements of a plurality of beam measurements associated with the subset of beam measurement configurations.

Aspect 31: The method of any of aspects 22 through 30, wherein transmitting the control signaling comprises: transmitting the control signaling that indicates the plurality of beam measurement configurations that are associated with respective zone identifiers that are to be used by the aerial UE to determine the subset of beam measurement configurations for beam measurement and reporting.

Aspect 32: The method of any of aspects 22 through 31, further comprising: transmitting control signaling that activates the subset of beam measurement conjurations based at least in part on a current zone in which the UE is operating.

Aspect 33: The method of any of aspects 22 through 32, further comprising: receiving the measurement report that indicates the one or more measurements associated with one or more beams selected based at least in part on a zone in which the aerial UE is operating.

Aspect 34: The method of aspect 33, wherein the one or more beams are associated with the subset of beam measurement configurations for the zone.

Aspect 35: The method of any of aspects 33 through 34, wherein the one or more beams are associated with a set of higher measurements of a plurality of beam measurements associated with the subset of beam measurement configurations for the zone.

Aspect 36: The method of any of aspects 22 through 35, wherein transmitting the control signaling comprises: transmitting a measurement object that indicates one or more of the plurality of beam measurement configurations and includes one or more fields associated with determining the subset of beam measurement configurations by the aerial UE.

Aspect 37: The method of aspect 36, wherein the measurement object includes an altitude fields, a time field, a zone field, or a combination thereof.

Aspect 38: The method of any of aspects 22 through 37, further comprising: receiving an indication of a capability of the aerial UE of supporting beam measurement configurations that are based on a current time, or a current location of the aerial UE, or both, wherein the control signaling is transmitted based at least in part on receiving the indication.

Aspect 39: An apparatus for wireless communication at an aerial UE, comprising a processor; memory coupled with the processor; and instructions stored in the memory and executable by the processor to cause the apparatus to perform a method of any of aspects 1 through 21.

Aspect 40: An apparatus for wireless communication at an aerial UE, comprising at least one means for performing a method of any of aspects 1 through 21.

Aspect 41: A non-transitory computer-readable medium storing code for wireless communication at an aerial UE, the code comprising instructions executable by a processor to perform a method of any of aspects 1 through 21.

Aspect 42: An apparatus for wireless communication at a network entity, comprising a processor; memory coupled with the processor; and instructions stored in the memory and executable by the processor to cause the apparatus to perform a method of any of aspects 22 through 38.

Aspect 43: An apparatus for wireless communication at a network entity, comprising at least one means for performing a method of any of aspects 22 through 38.

Aspect 44: A non-transitory computer-readable medium storing code for wireless communication at a network entity, the code comprising instructions executable by a processor to perform a method of any of aspects 22 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an aerial user equipment (UE), comprising:

receiving, from a network entity, control signaling that indicates a plurality of beam measurement configurations that the aerial UE is to use for beam measurement and reporting associated with a plurality of beams;

activating a subset of beam measurement configurations of the plurality of beam measurement configurations, the subset of beam measurement configurations of the plurality of beam measurement configurations based at least in part on a current location of the aerial UE;

monitoring a set of beams of the plurality of beams in accordance with the subset of beam measurement configurations of the plurality of beam measurement configurations; and transmitting, to the network entity, a measurement report indicating one or more measurements of a subset of beams of the set of beams in accordance with the subset of beam measurement configurations.

2. The method of claim 1, further comprising:

transmitting, to the network entity an indication of a flight path associated with the aerial UE, wherein the control signaling that indicates the plurality of beam measurement configurations is received based at least in part on the flight path.

3. The method of claim 1, wherein monitoring the set of beams comprises:

monitoring the set of beams in accordance with the subset of beam measurement configurations that is based at least in part on a current time relative to a flight path associated with the aerial UE.

4. The method of claim 1, further comprising:

receiving, from the network entity, control signaling that activates the subset of beam measurement configurations, wherein monitoring the set of beams is based at least part on the activated subset of beam measurement configurations.

5. The method of claim 1, wherein transmitting the measurement report comprises:

transmitting, to the network entity, the measurement report that indicates the one or more measurements associated with one or more beams selected based at least in part on a current time or a current time relative to a flight path associated with the aerial UE.

6. The method of claim 1, wherein transmitting the measurement report comprises:

transmitting, to the network entity, the measurement report that indicates the one or more measurements associated with one or more beams selected based at least in part on an antenna configuration of the aerial UE.

7. The method of claim 1, further comprising:

monitoring the set of beams in accordance with the subset of beam measurement configurations that is based at least in part on the current location, wherein the current location is an altitude of the aerial UE.

8. The method of claim 7, further comprising:

determining the plurality of beam measurement configurations based at least in part on the altitude of the aerial UE relative to an altitude threshold.

9. The method of claim 1, wherein receiving the control signaling comprises:

receiving, from the network entity, the control signaling that indicates the plurality of beam measurement configurations that are associated with respective altitude thresholds that are to be used by the aerial UE to determine the subset of beam measurement configurations for beam measurement and reporting.

10. The method of claim 1, further comprising:

transmitting, to the network entity, the measurement report that indicates the one or more measurements associated with one or more beams selected based at least in part on an altitude of the aerial UE relative to an altitude threshold.

11. The method of claim 10, wherein the one or more beams are associated with the subset of beam measurement configurations associated with an altitude range in which the aerial UE is operating.

12. The method of claim 10, wherein the one or more beams are selected as being associated with a set measurement metrics that are higher or lower than other measurement metrics of a plurality of beam measurements associated with the subset of beam measurement configurations.

13. The method of claim 1, further comprising:

monitoring the set of beams in accordance with the subset of beam measurement configurations based at least in part on the current location, wherein the current location is a zone identifier of a zone in which the aerial UE is operating.

14. The method of claim 1, wherein receiving the control signaling comprises:

receiving, from the network entity, the control signaling that indicates the plurality of beam measurement configurations that are associated with respective zone identifiers that are to be used by the aerial UE to determine the subset of beam measurement configurations for beam measurement and reporting.

15. The method of claim 1, further comprising:

receiving, from the network entity, control signaling that activates the subset of beam measurement configurations based at least in part on a current zone in which the UE is operating.

16. The method of claim 1, further comprising:

transmitting, to the network entity, the measurement report that indicates the one or more measurements associated with one or more beams selected based at least in part on a zone in which the aerial UE is operating.

17. The method of claim 16, wherein the one or more beams are associated with the subset of beam measurement configurations for the zone.

18. The method of claim 16, wherein the one or more beams are associated with a set of measurement metrics that are higher or lower than other measurement metrics of a plurality of beam measurements associated with the subset of beam measurement configurations for the zone.

19. The method of claim 1, wherein receiving the control signaling comprises:

receiving, from the network entity, a measurement object that indicates one or more of the plurality of beam measurement configurations and includes one or more fields associated with determining the subset of beam measurement configurations by the aerial UE.

20. The method of claim 19, wherein the measurement object includes an altitude fields, a time field, a zone field, or a combination thereof.

21. The method of claim 1, further comprising:

transmitting, to the network entity, an indication of a capability of the aerial UE of supporting beam measurement configurations that are based on a current time, or a current location of the aerial UE, or both, wherein the control signaling is received based at least in part on transmitting the indication.

22. The method of claim 1, further comprising:

selecting, based at least in part on the current location of the aerial UE, the subset of beams to be included in the measurement report.

23. An apparatus for wireless communication at an aerial user equipment (UE), comprising:

one or more processors;

one or more memories coupled with the one or more processors; and instructions stored in the memory and executable by the one or more processors to cause the apparatus to:

receive, from a network entity, control signaling that indicates a plurality of beam measurement configurations that the aerial UE is to use for beam measurement and reporting associated with a plurality of beams;

activate a subset of beam measurement configurations of the plurality of beam measurement configurations, the subset of beam measurement configurations of the plurality of beam measurement configurations based at least in part on a current location of the aerial UE;

monitor a set of beams of the plurality of beams in accordance with the subset of beam measurement configurations of the plurality of beam measurement configurations; and transmit, to the network entity, a measurement report indicating one or more measurements of a subset of beams of the set of beams in accordance with the subset of beam measurement configurations.

* * * * *